United States Patent [19]
Butterfield et al.

[11] Patent Number: 5,367,992
[45] Date of Patent: Nov. 29, 1994

[54] VARIABLE CAMSHAFT TIMING SYSTEM FOR IMPROVED OPERATION DURING LOW HYDRAULIC FLUID PRESSURE

[75] Inventors: Roger P. Butterfield, Trumansburg; Franklin R. Smith, Slaterville Springs; Curt A. Wykstra, Moravia, all of N.Y.

[73] Assignee: Borg-Warner Automotive, Inc., Sterling Heights, Mich.

[21] Appl. No.: 97,355

[22] Filed: Jul. 26, 1993

[51] Int. Cl.⁵ .............................................. F01L 1/34
[52] U.S. Cl. ............................. 123/90.17; 123/90.31
[58] Field of Search ............... 123/90.15, 90.16, 90.17, 123/90.31

[56] References Cited

U.S. PATENT DOCUMENTS

| | | | |
|---|---|---|---|
| 4,537,164 | 8/1985 | Ajiki et al. ........................ | 123/90.16 |
| 5,002,023 | 3/1991 | Butterfield et al. ............... | 123/90.15 |
| 5,056,477 | 10/1991 | Linder et al. ...................... | 123/90.17 |
| 5,107,804 | 4/1992 | Becker et al. ..................... | 123/90.17 |
| 5,113,814 | 5/1992 | Suga et al. ........................ | 123/90.17 |
| 5,121,717 | 6/1992 | Simko et al. ...................... | 123/90.17 |
| 5,172,659 | 12/1992 | Butterfield et al. ............... | 123/90.17 |
| 5,201,289 | 4/1993 | Imai ................................. | 123/90.31 |
| 5,205,249 | 4/1993 | Markley et al. ................... | 123/90.17 |
| 5,207,192 | 5/1993 | Smith ................................ | 123/90.17 |
| 5,218,935 | 6/1993 | Quinn, Jr. et al. ................ | 123/90.17 |

*Primary Examiner*—Willis R. Wolfe
*Assistant Examiner*—Weilun Lo
*Attorney, Agent, or Firm*—Willian Brinks Hofer Gilson & Lione

[57] ABSTRACT

A variable camshaft timing system (VCT system) for an internal combustion engine having a rotatable crankshaft (22) and a rotatable camshaft (26, 126). The camshaft (26, 126) is position variable relative to the crankshaft (22). A spool valve (192) including a spool (200) slidable within a cylindrical member (198) selectively controls the movement of hydraulic fluid for actuating the oscillation of the hydraulic operators (54, 56, 160a, 160b) within the housing recess (132a, 132b) as the housing oscillates with respect to the camshaft (26, 126). In accordance with various aspects of the present invention, the VCT system also includes a means for controlling the position of the spool (200), a means for removing air from the VCT system and seals (160h) for sealing the housing (130) outer periphery to prevent hydraulic fluid from draining out of the VCT system when the engine is shut down.

23 Claims, 17 Drawing Sheets

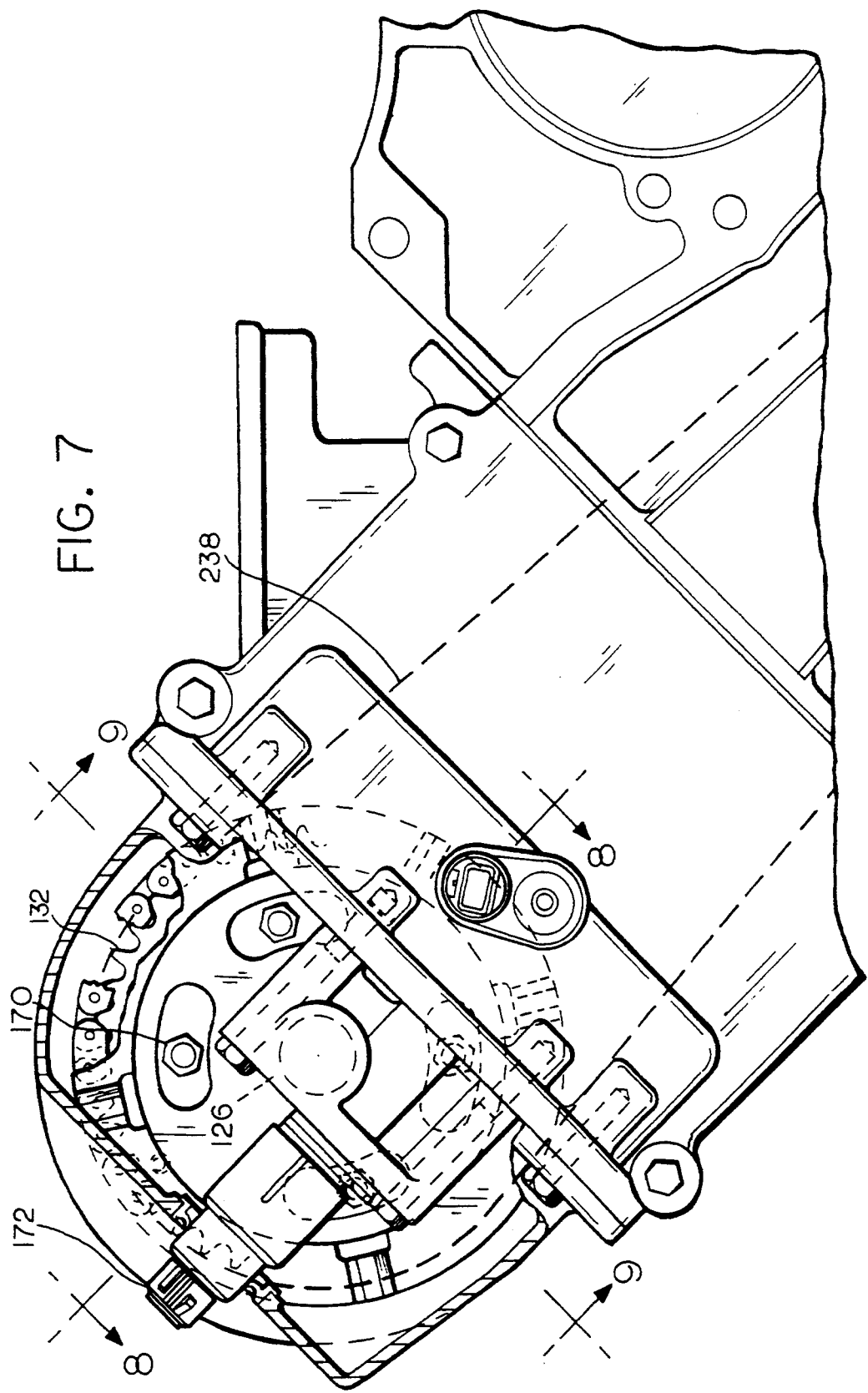

5,367,992

VARIABLE CAMSHAFT TIMING SYSTEM FOR IMPROVED OPERATION DURING LOW HYDRAULIC FLUID PRESSURE

FIELD OF THE INVENTION

This invention relates to a hydraulically controlled variable camshaft timing system for improved operation during low hydraulic fluid pressure. More particularly, this invention relates to a variable camshaft timing system capable of purging unwanted air from the hydraulically controlled variable camshaft timing system and operating the variable camshaft timing system from a known position during periods of low hydraulic fluid pressure.

BACKGROUND OF THE INVENTION

The fundamental operation of hydraulically controlled variable camshaft timing systems (hereinafter referred to as "VCT systems") is well known. For example, U.S. Pat. No. 5,002,023 describes a VCT system within the field of the invention in which the system hydraulics includes a pair of oppositely acting hydraulic cylinders with appropriate hydraulic flow elements to selectively transfer hydraulic fluid from one of the cylinders to the other, or vice versa, to thereby advance or retard the circumferential position of a camshaft relative to a crankshaft.

U.S. Pat. No. 5,107,804 also further describes a VCT system within the field of the invention in which the system hydraulics include a vane having lobes within an enclosed housing, the vane being oscillatable with respect to the housing, with appropriate hydraulic flow elements to transfer hydraulic fluid within the housing from one side of a lobe to the other, or vice versa, to thereby oscillate the vane with respect to the housing in one direction or the other, an action which is effective to advance or retard the position of the camshaft relative to the crankshaft.

Generally, the control system for the VCT systems of U.S. Pat. Nos. 5,002,023 and 5,107,804 utilize a control valve in which the exhaustion of hydraulic fluid from one or another of the oppositely acting cylinders or lobes is permitted by moving a spool within the valve one way or another from its centered or null position. The movement of the spool may occur in response to an increase or decrease in control hydraulic pressure on an end of the spool and the relationship between the hydraulic force on such end and an oppositely direct mechanical force on the other end.

Although the many known VCT systems have been proven to perform satisfactorily, further improvements on the operation of VCT systems of the type described herein are desired. For example, an hydraulically operated VCT system relies on the presence of pressurized engine lubricating oil or other hydraulic fluid within the VCT system to function properly and predictably. This condition is achieved during normal engine operation, when engine lubricating oil is used as the hydraulic fluid within the VCT system, since adequate pressurization of the engine lubricating oil inherently results from the operation of the engine. However, when an automotive engine is shut off, the pressure of the engine lubricating oil soon drops, and the hydraulic fluid within a VCT system of the aforesaid type will normally drain back to the engine crankcase introducing unwanted air into the VCT system.

It will be appreciated that during engine start-up the unwanted air is distributed throughout the VCT system thereby causing excessive oscillation of the hydraulic cylinders or lobes of the VCT system which in turn causes noise in the VCT system or the associated valve train until such time as the air is displaced with hydraulic fluid. Consequently, there is a significant need for an improved VCT system that overcomes the problems associated with hydraulic fluid draining from the VCT system when the engine is not running and with the introduction of air into the hydraulically operated VCT system. Furthermore, there is a significant need for an improved VCT system that prevents hydraulic fluid from draining from the VCT system when the engine is not running and removes air from the VCT system when the engine is running to facilitate the quiet operation of the VCT system and prevent unwanted noise.

In addition to the foregoing, there is a significant need to operate the VCT system to a controlled known position when there is zero hydraulic pressure in the hydraulic control system until the VCT system obtains sufficient hydraulic fluid pressure. As used herein the term "sufficient hydraulic fluid pressure" refers to the lowest possible hydraulic fluid pressure at which the engine will operate. Operation of the VCT system in a known position until the pressure of the hydraulic fluid within the VCT system is adequately high ensures normal, quiet operation of the VCT system during all phases of engine operation including periods when the engine has not developed full hydraulic fluid pressure such as during engine start-up.

SUMMARY OF THE INVENTION

The present invention provides an improved VCT system for an internal combustion engine having a rotatable crankshaft and a rotatable camshaft. The VCT system may be of the type disclosed in U.S. Pat. Nos. 5,002,023 and 5,107,804.

Briefly, the VCT system includes at least one pair of oppositely acting hydraulic operators secured to the camshaft for rotation therewith, a housing mounted on the camshaft for rotation and oscillation with the camshaft, means for controlling a position of the at least one pair of oppositely acting hydraulic operators with respect to the housing.

In a preferred embodiment of the present invention the VCT system is of a pumping vane type including a first lobe connected to the crankshaft and to the camshaft and a second lobe connected to the crankshaft and the camshaft. Operation of the first lobe is effective to vary the position of the camshaft relative to the crankshaft in a given circumferential direction and operation of the second lobe is effective to vary the position of the camshaft relative to the crankshaft in an opposed circumferential direction.

The housing of the VCT system has a recess for receiving the at least one pair of oppositely acting hydraulic operators and permitting oscillation of the at least one pair of oppositely acting hydraulic operators within the recess as the housing oscillates with respect to the camshaft. The housing recess is enclosed around the hydraulic operators by an opposing transverse circular end plate and outboard spacer and a sprocket and inboard spacer such that the end plate and the sprocket are fixed axially along the camshaft and free to oscillate relative to the camshaft. Radial seals are provided between the end plate and outboard spacer and the sprocket and inboard spacer to provide a seal between the end plate, housing and sprocket and the outboard spacer, rotor, inboard spacer and camshaft. The radial seals may be formed of material typically employed in the manufacture automotive elastomer lip seals such as a series of fluoroelastomers based on the copolymer of vinylidene fluoride and hexafluoropropylene sold under the trademark Viton of Du Pont de Nemours, E. I. & Company. The housing outer periphery is also sealed with respect to the inner surface of the sprocket and the end plate by an interference fit to prevent hydraulic fluid from draining out of the VCT system when the engine is shut down and prevent hydraulic fluid from leaking out of the VCT system during engine cranking when hydraulic fluid pressure is zero and make-up hydraulic fluid is not available.

The position of the at least one pair of oppositely acting hydraulic operators is controlled with respect to the housing by selective movement of hydraulic fluid. The hydraulic operators are controlled by a source of hydraulic fluid under pressure in communication with the camshaft, a secondary passage for supplying hydraulic fluid from the camshaft to the housing recess and a spool valve for selectively controlling movement of hydraulic fluid for actuating the oscillation of the hydraulic operators within the housing recess as the housing oscillates with respect to the camshaft. The secondary passage is in fluid communication with the camshaft and the housing recess such that during rotation of the camshaft hydraulic fluid within the camshaft is centrifugally driven to the camshaft outer circumference through the secondary passage to the housing recess. The secondary passage is preferably in communication with the outer circumference of the camshaft at an area of maximum camshaft internal diameter.

The spool valve of the VCT system includes a cylindrical member in communication with the camshaft and a spool reciprocal within the cylindrical member. The spool includes first and second spaced apart lands. The spool is positioned at a fully advanced or fully retarded position when the VCT system is at zero hydraulic fluid pressure. In one embodiment of the invention the spool may be positioned within the housing by a pair of counter balance springs acting on the spool to provide opposing forces to the spool and position the spool when the VCT system is at zero hydraulic fluid pressure. In yet another embodiment of the invention the VCT system includes a bypass circuit having a bypass valve and a first bypass line to allow hydraulic fluid to flow from the system and permit the vane to move to the advanced or retarded position during zero hydraulic fluid pressure. After sufficient hydraulic fluid pressure is generated in the engine the bypass valve closes and the VCT system is controlled by operation of the spool valve. The first bypass line is in communication with a first conduit means and at least one of the hydraulic operators and the bypass valve is interposed across the first bypass line and biased by a spring and oppositely acting hydraulic pressure from a second bypass line in communication with the first conduit means such that when the engine is operating at zero hydraulic fluid pressure the bypass valve is biased by the spring to an open position to allow flow of hydraulic fluid from at least one of the hydraulic operators and, after sufficient hydraulic fluid pressure has developed within the engine the bypass valve is biased to a closed position by the spring and engine hydraulic fluid pressure in the second bypass line.

To facilitate quiet operation, the VCT system may include a means for removing air from the VCT system in response to the rotation of the camshaft. In a preferred embodiment, the air is separated from the hydraulic fluid of the VCT system in a rotating cylindrical member by centrifugal force acting upon the mixture of air and hydraulic fluid. The means for removing air from the VCT system includes a means for separating the air from the hydraulic fluid by a centrifugal force separating means. In one embodiment of the present invention the means for removing air includes an opening formed the longitudinal length of the spool to provide communication between the camshaft and external the VCT system for venting of unwanted air within the VCT system. In operation, during rotation of the camshaft, hydraulic fluid within the camshaft is centrifugally driven to the outer circumference of the camshaft to the secondary passage and any air within the camshaft is driven to the center of the camshaft for purging through the opening external the VCT system. The opening has interposed therein a check valve to regulate flow of air from the camshaft through the opening external the VCT system. The check valve includes a spring biased ball for regulating the flow of air from the VCT system such that upon completion of the expulsion of air from the VCT system the hydraulic fluid contacts the biased ball causing the ball to close the valve and stop the flow of hydraulic fluid from the camshaft. The ball of the check valve may or may not completely seal with the seat.

In another embodiment of the present invention the means for removing air may comprise a tube positioned across a diameter of the camshaft. The tube is in communication with external of the VCT system and has an orifice near a diametrical center of the camshaft such that as the camshaft rotates the hydraulic fluid separates from the air thereby forcing the air through the orifice of the tube. In a preferred embodiment, the tube is positioned on a camshaft journal bearing supporting the camshaft such that the tube prevents the camshaft from completely draining when the engine is turned off thereby minimizing the amount of air to be purged during engine start-up.

For a further understanding of the present invention and the objects thereof, attention is directed to the drawing and the following brief description thereof, to the detailed description of the preferred embodiment, and to the appended claims.

BRIEF DESCRIPTION OF THE DRAWING

FIG. 7 is a fragmentary view of the right bank of an engine block including an embodiment of a VCT system according to the present invention;

DETAILED DESCRIPTION OF THE PREFERRED EMBODIMENTS

Figure 1:
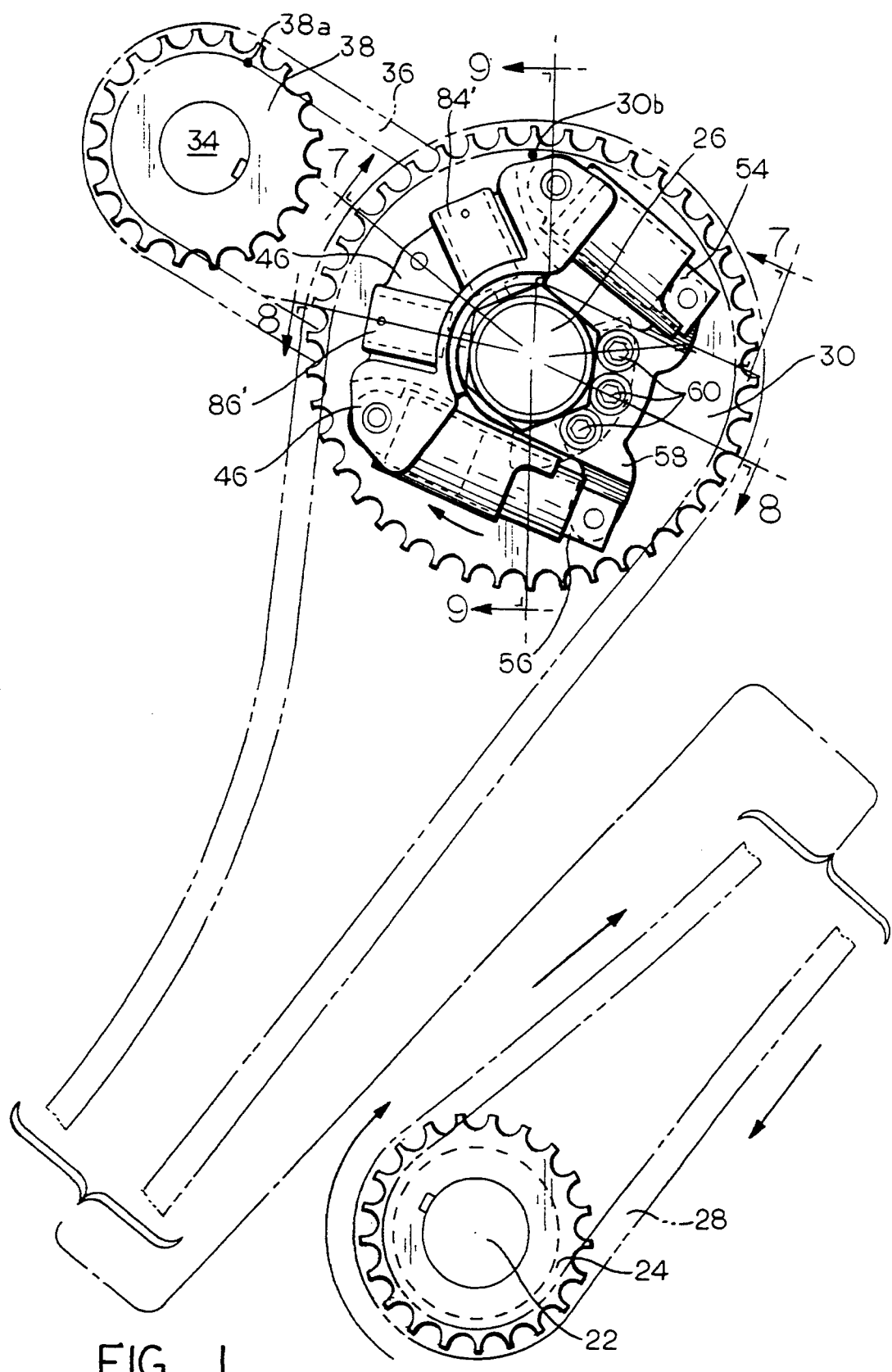
FIG. 1 is a fragmentary view of a dual camshaft internal combustion engine incorporating an embodiment of a VCT system according to the present invention, the view being taken on a plane extending transversely through the crankshaft and the camshafts and showing the intake camshaft in a retarded position relative to the crankshaft and the exhaust camshaft.

In the following description, unless indicated otherwise, like reference characters designate like or corresponding parts.

Referring to FIGS. 1–6, a crankshaft 22 has a sprocket 24 keyed thereto, and rotation of the crankshaft 22 during the operation of the engine in which it is incorporated, otherwise not shown, is transmitted to an exhaust camshaft 26, that is, a camshaft which is used to operate the exhaust valves of the engine, by a chain 28 which is trained around the sprocket 24 and a sprocket 30 which is keyed to the camshaft 26. Although not shown, it is to be understood that suitable chain tighteners will be provided to ensure that the chain 28 is kept tight and relatively free of slack. As shown, the sprocket 30 is twice as large as the sprocket 24. This relationship results in a rotation of the camshaft 26 at a rate of one-half that of the crankshaft 22, which is proper for a 4-cycle engine. It is to be understood that the use of a belt in place of the chain 28 is also contemplated.

Figure 6:
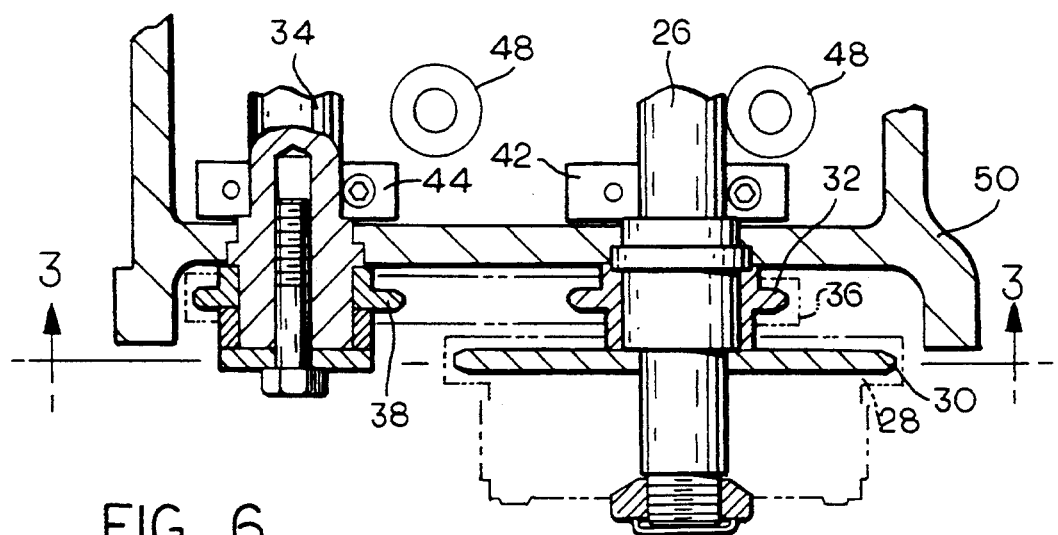
FIG. 6 is a fragmentary view taken along line 6—6 of FIG. 4.
Figure 3:
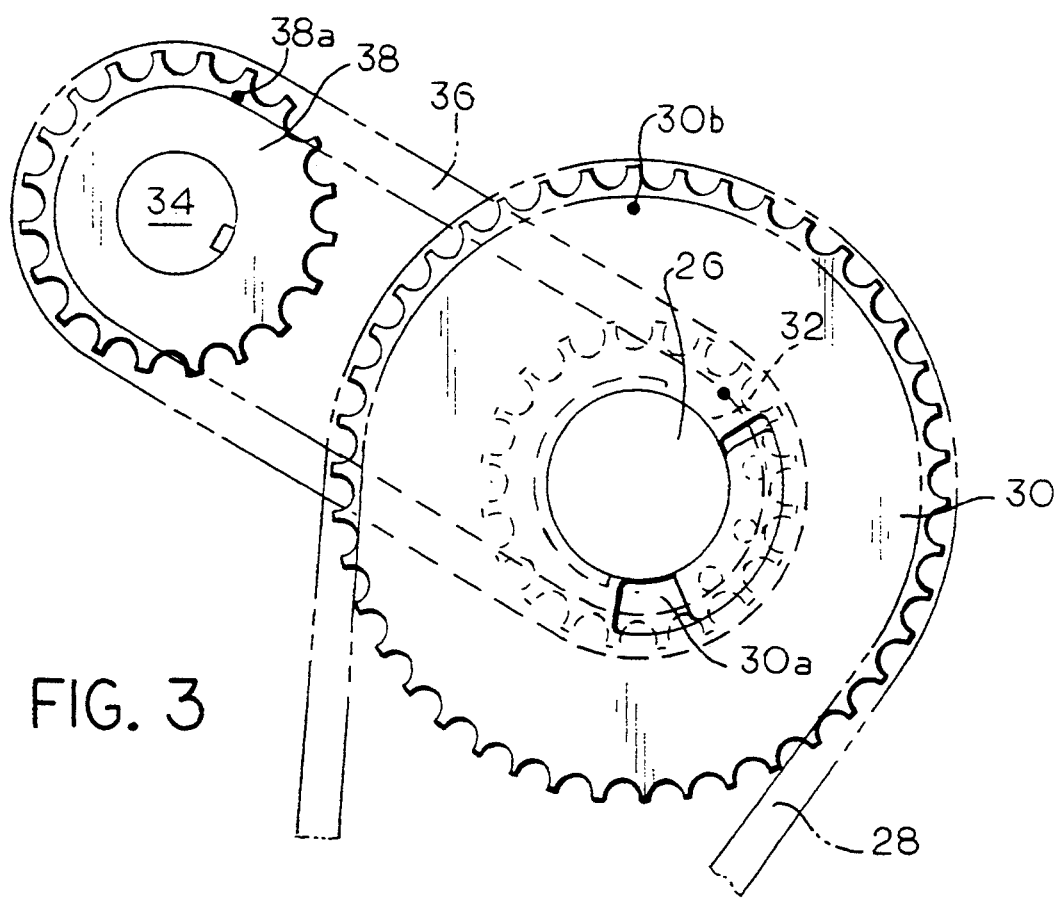
FIG. 3 is a fragmentary view taken on line 3—3 of FIG. 6 with some of the structure removed for clarity and being shown in the retarded position.
Figure 5:
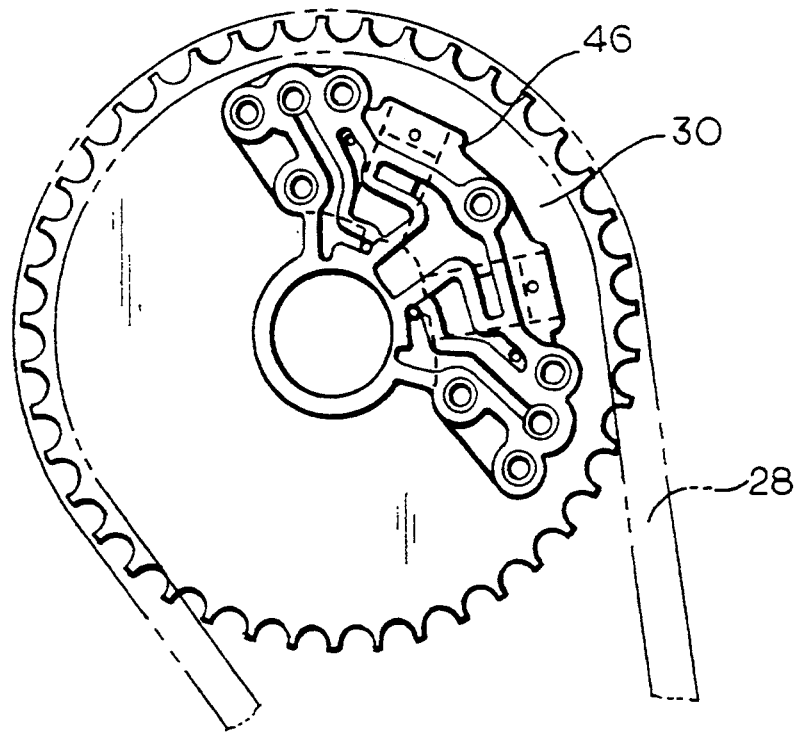
FIG. 5 is a fragmentary view showing the reverse side of some of the structure illustrated in FIG. 1.
Figure 4:
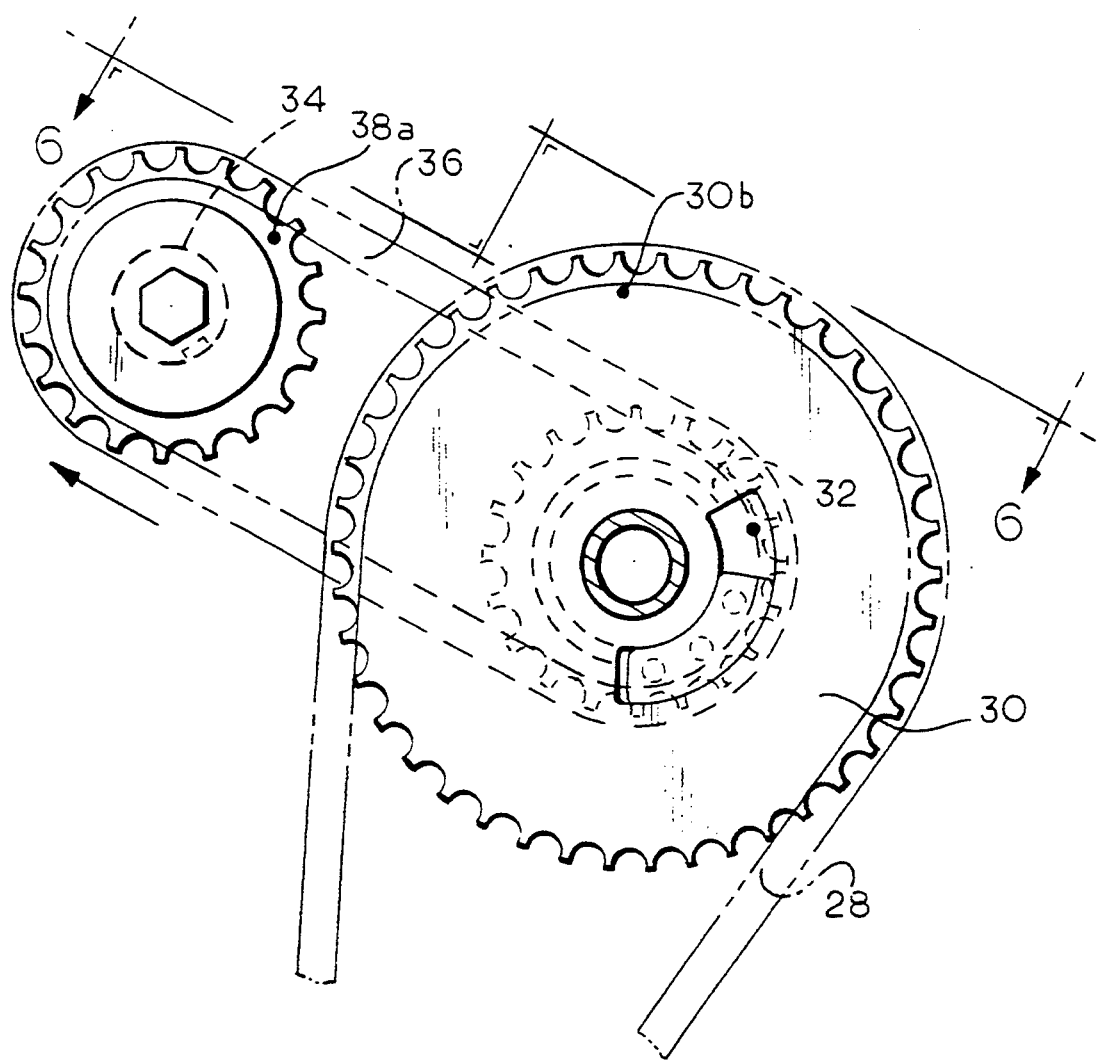
FIG. 4 is a fragmentary view similar to FIG. 3 showing the intake camshaft in an advanced position relative to the exhaust camshaft.

The camshaft 26 carries another sprocket, namely sprocket 32, FIG. 3, 4 and 6, journalled thereon to be oscillatable through a limited arc with respect thereto and to be otherwise rotatable with the camshaft 26. Rotation of the camshaft 26 is transmitted to an intake camshaft 34 by a chain 36 which is trained around the sprocket 32 and a sprocket 38 that is keyed to the intake camshaft 34. As shown, the sprockets 32 and 38 are equal in diameter to provide for equivalent rates of rotation between the camshaft 26 and the camshaft 34. The use of a belt in place of the chain 36 is also contemplated.

As is illustrated in FIG. 6, an end of each of the camshafts 26 and 34 is journalled for rotation in bearings 42 and 44, respectively, of the head 50, which is shown fragmentarily and which is bolted to an engine block, otherwise not shown, by bolts 48. The opposite ends of the camshafts 26 and 34, not shown, are similarly journalled for rotation in an opposite end, also not shown, of the head 50. The sprocket 38 is keyed to the camshaft 34 at a location of the camshaft 34 which is outwardly of the head 50. Similarly, the sprockets 32 and 30 are positioned, in series, on the camshaft 26 at locations outwardly of the head 50, the sprocket 32 being transversely aligned with the sprocket 38 and the sprocket 30 being positioned slightly outwardly of the sprocket 32, to be transversely aligned with the sprocket 24.

Figure 2:
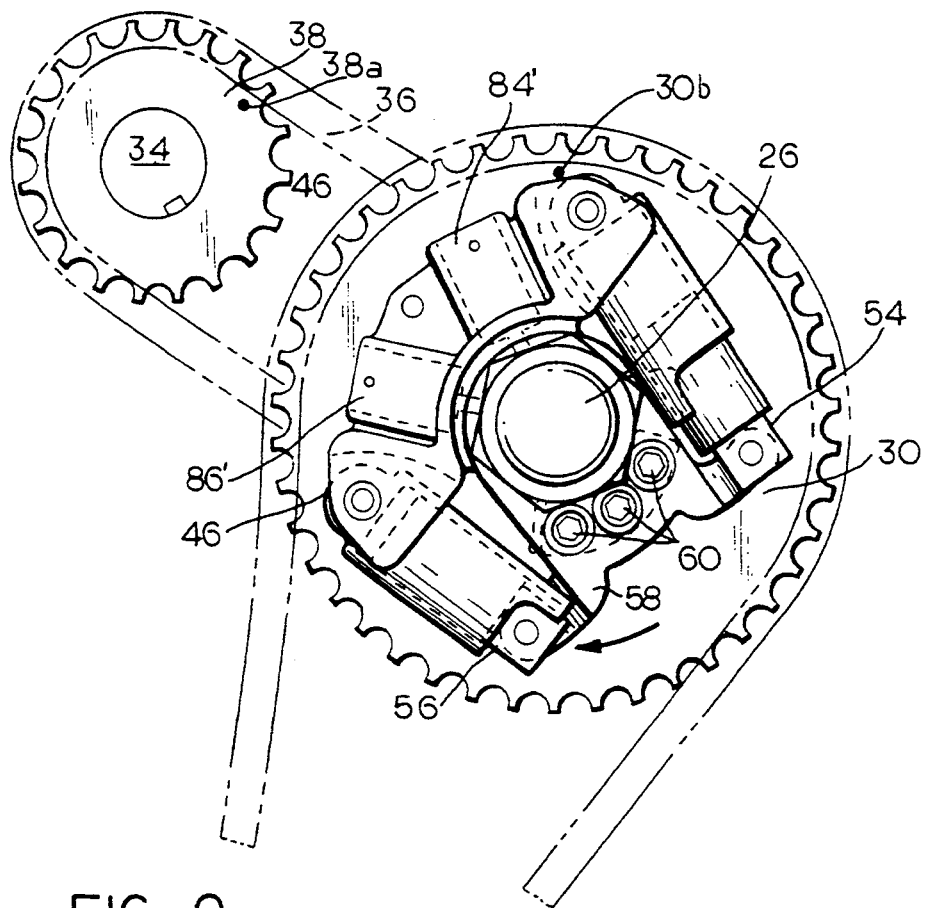
FIG. 2 is a fragmentary view similar to a portion of FIG. 1 showing the intake camshaft in an advanced position relative to the exhaust camshaft.

The sprocket 32 has an arcuate retainer (not shown) as an integral part thereof, and the retainer extends outwardly from the sprocket 32 through an arcuate opening 30a in the sprocket 30. The sprocket 30 has an arcuate hydraulic body 46 bolted thereto and the hydraulic body 46, which houses certain of the hydraulic components of the associated hydraulic control system, receives and pivotably supports the body end of each of a pair of oppositely acting, single acting hydraulic operators shown as hydraulic cylinders 54 and 56 which are positioned on opposite sides of the longitudinal axis of the camshaft 26. The piston ends of the cylinders 54 and 56 are pivotally attached to an arcuate bracket 58, and the bracket 58 is secured to the sprocket 32 by a plurality of threaded fasteners 60. Thus, by extending one of the cylinders 54 and 56 and by simultaneously retracting the other of the cylinders 54 and 56, the arcuate position of the sprocket 32 will be changed relative to the sprocket 30, either to advance the sprocket 32 if the cylinder 54 is extended and the cylinder 56 is retracted, which is the operating condition illustrated in FIGS. 2 and 4, or to retard the sprocket 32 relative to the sprocket 30 if the cylinder 56 is extended and the cylinder 54 is retracted, which is the operating condition illustrated in FIGS. 1 and 3. In either case, the retarding or advancing of the position of the sprocket 32 relative to the position of the sprocket 30, which is selectively permitted or prevented in reaction to the direction of torque in the camshaft 26, as explained in the aforesaid U.S. Pat. No. 5,002,023, will advance or retard the position of the camshaft 34 relative to the position of the camshaft 26 by virtue of the chain drive connection provided by the chain 36 between the sprocket 32, which is journalled for limited relative arcuate movement on the camshaft 26, and the sprocket 38, which is keyed to the camshaft 34. This relationship can be seen in the drawing by comparing the relative position of a timing mark 30b on the sprocket 30 and a timing mark 38a on the sprocket 38 in the retard position of the camshaft 34, as is shown in FIGS. 1 and 3, to their relative positions in the advanced position of the camshaft 34, as is shown in FIGS. 2 and 4.

For a more detailed discussion of the operation and construction of various VCT systems in accordance with the present invention reference is made to U.S. Pat. Nos. 5,002,023; 5,046,460; 5,107,804; 5,172,659; 5,184,578; 5,152,261 and U.S. patent applications Ser. Nos. 07/940,273, now U.S. Pat. No. 5,218,935; 07/883,096, now U.S. Pat. No. 5,207,192; 07/883,581, now U.S. Pat. No. 5,205,249; incorporated herein by reference.

Referring to FIGS. 7–19, a vane type VCT system in accordance with the present invention is illustrated in which a housing in the form of a sprocket 132 is oscillatingly journalled on a camshaft 126. The camshaft 126 may be considered to be the only camshaft of a single camshaft engine, either of the overhead camshaft type or the in block camshaft type. Alternatively, the camshaft 126 may be considered to be either the intake valve operating camshaft or the exhaust valve operating camshaft of a dual camshaft engine. In any case, the sprocket 132 and the camshaft 126 are rotatable together, and are caused to rotate by the application of torque to the sprocket 132 by an endless roller chain 138 and 238, shown fragmentarily, which is trained around the sprocket 132 and also around a crankshaft, not shown.

As will be hereinafter described in greater detail, the sprocket 132 is oscillatingly journalled on the camshaft 126 so that it is oscillatable at least through a limited arc with respect to the camshaft 126 during the rotation of the camshaft, an action which will adjust the phase of the camshaft 126 relative to the crankshaft.

Figure 8:
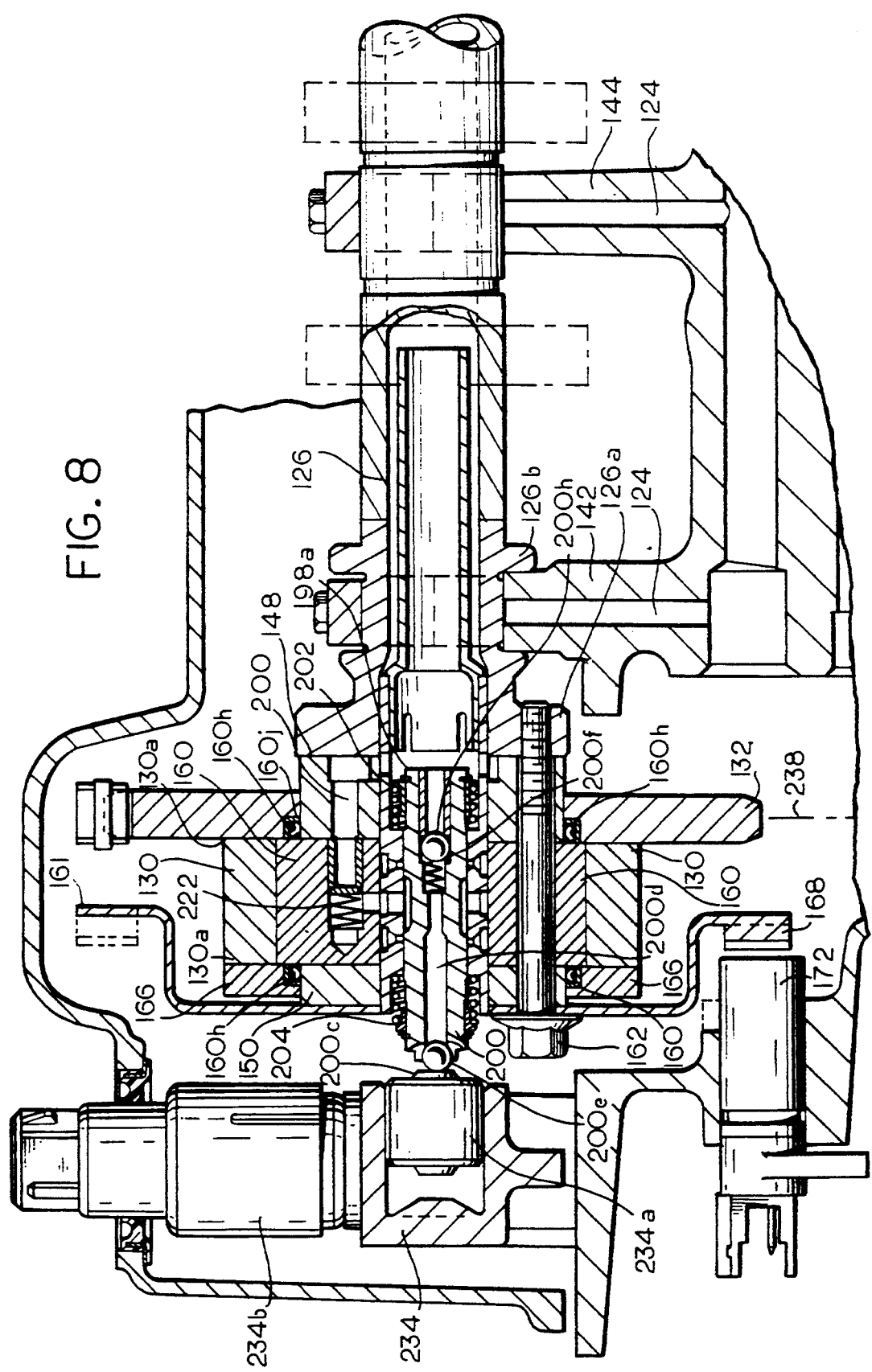
FIG. 8 is a cross sectional side view of the VCT system of the present invention taken along line 8—8 of FIG. 7.
Figure 9:
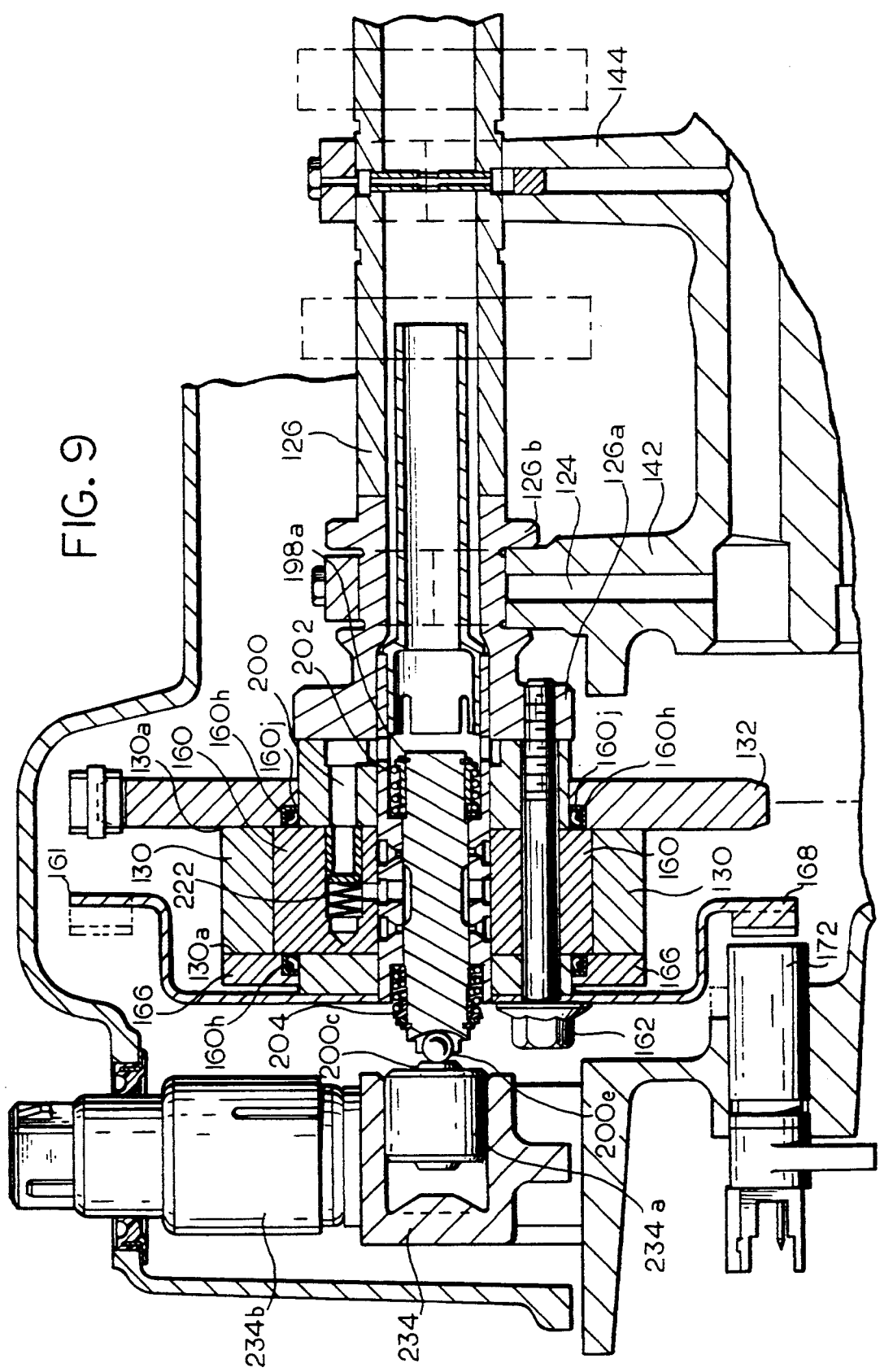
FIG. 9 is a cross sectional side view of a VCT system in accordance with another aspect of the present invention also taken along line 8—8 of FIG. 7.
Figure 10:
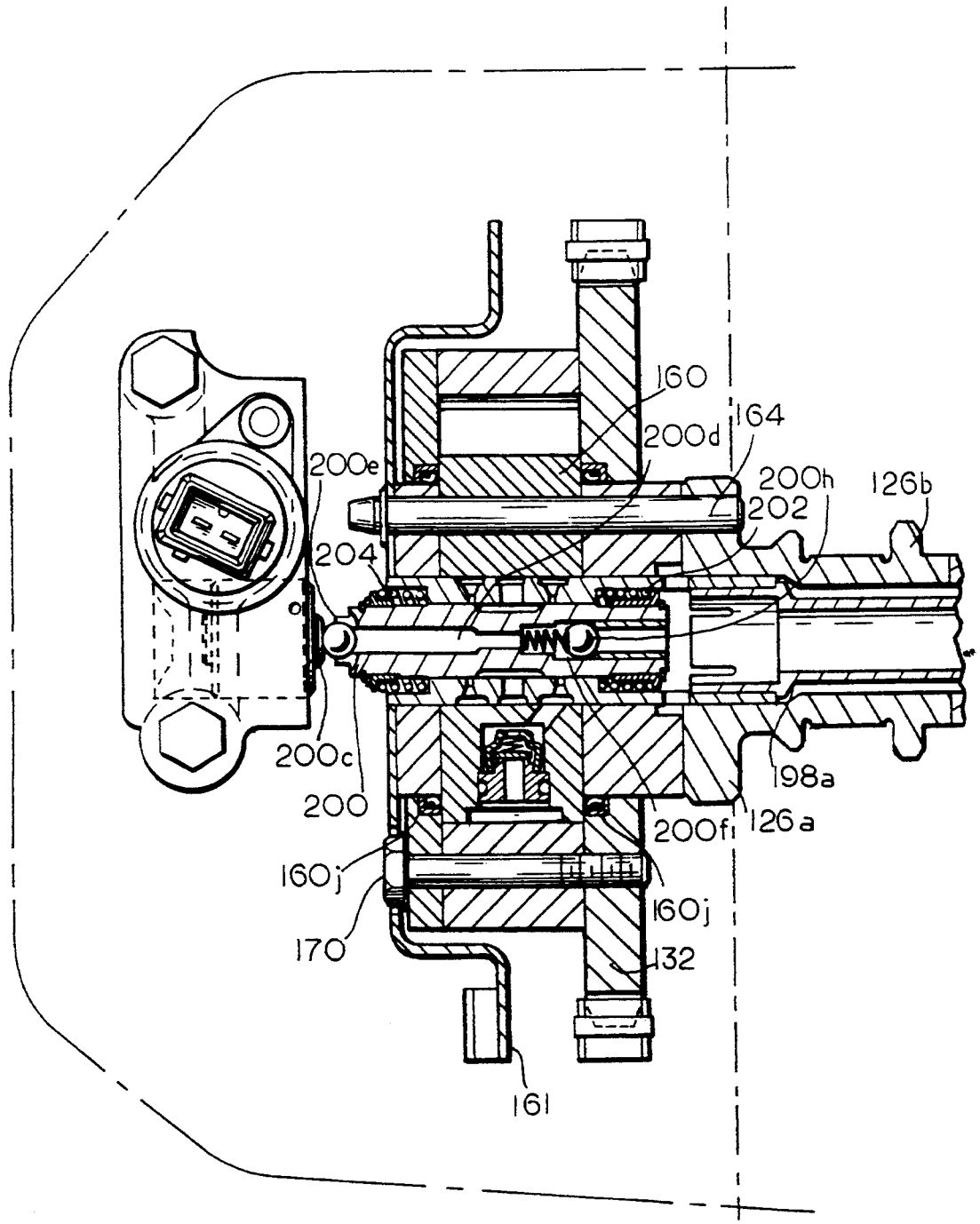
FIG. 10 is a fragmentary top view taken on line 9—9 of FIG. 7.
Figure 11:
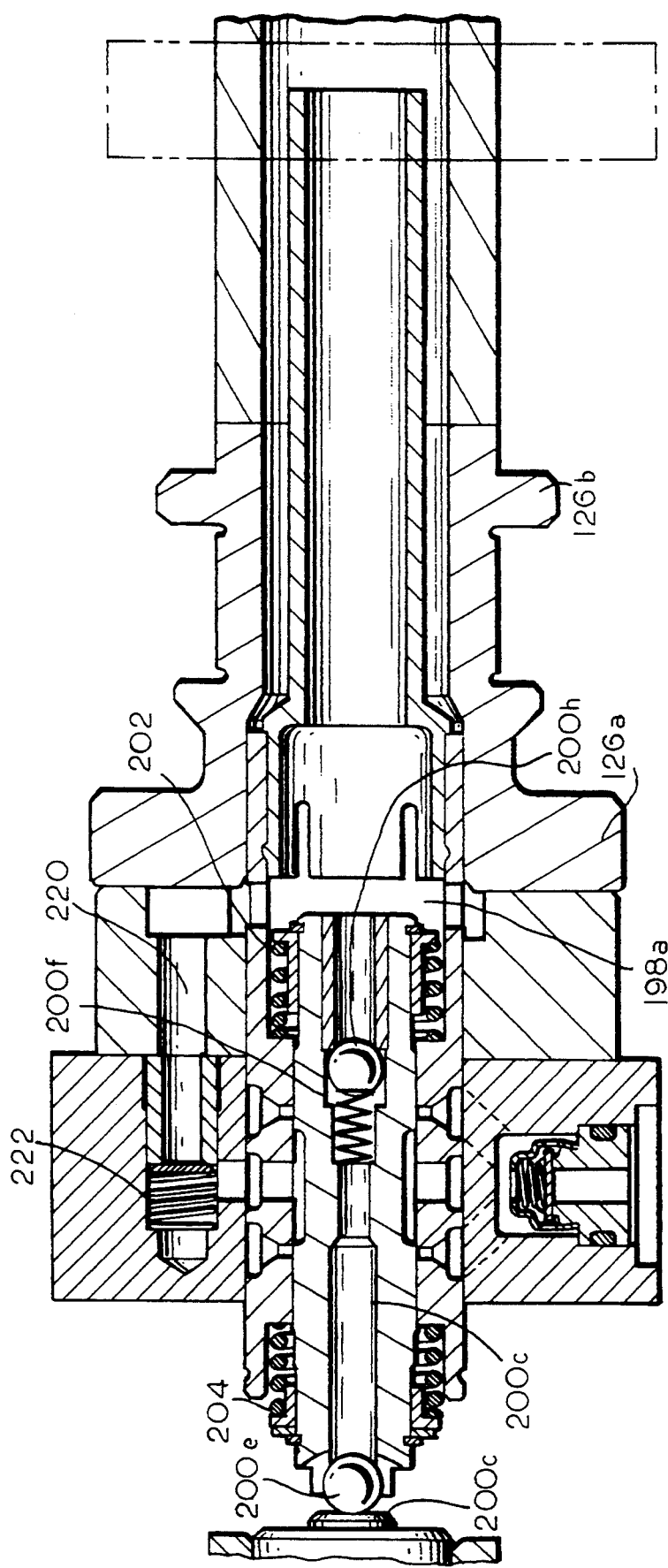
FIG. 11 is a fragmentary side view of FIG. 8 with some of the structure removed to further illustrate the hydraulic system.
Figure 12:
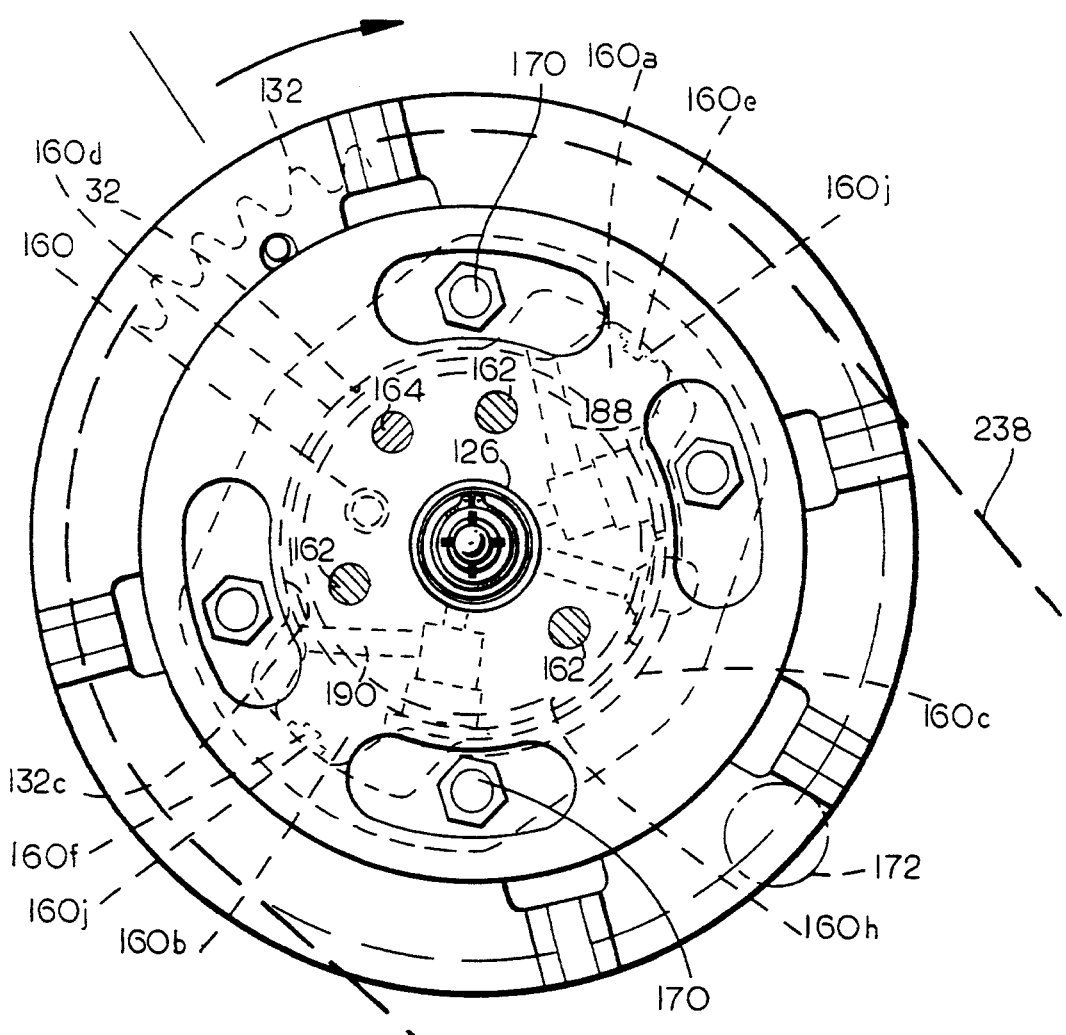
FIG. 12 is an end view of a camshaft in the null position.
Figure 13:
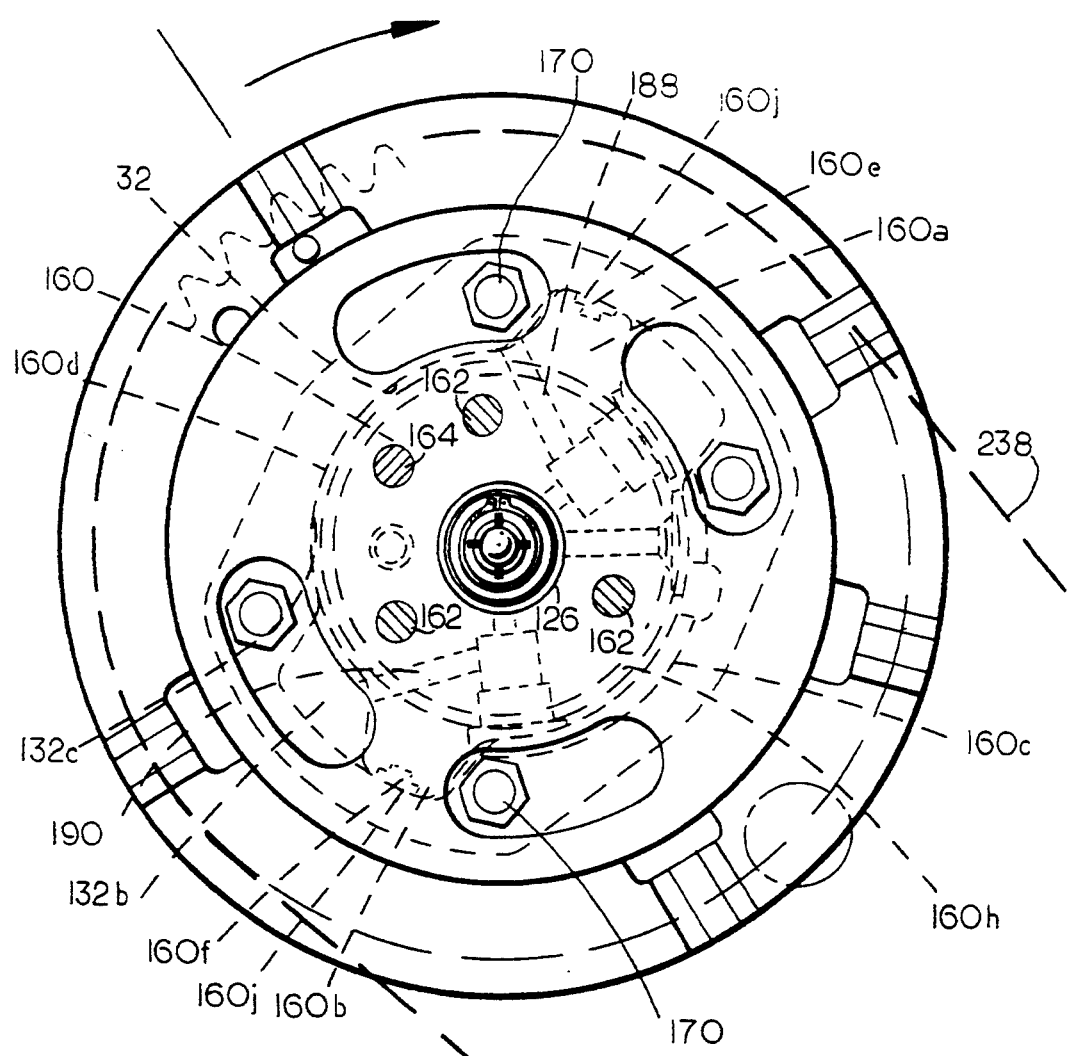
FIG. 13 is an end view of a spool valve of a VCT system in the retarded position.
Figure 14:
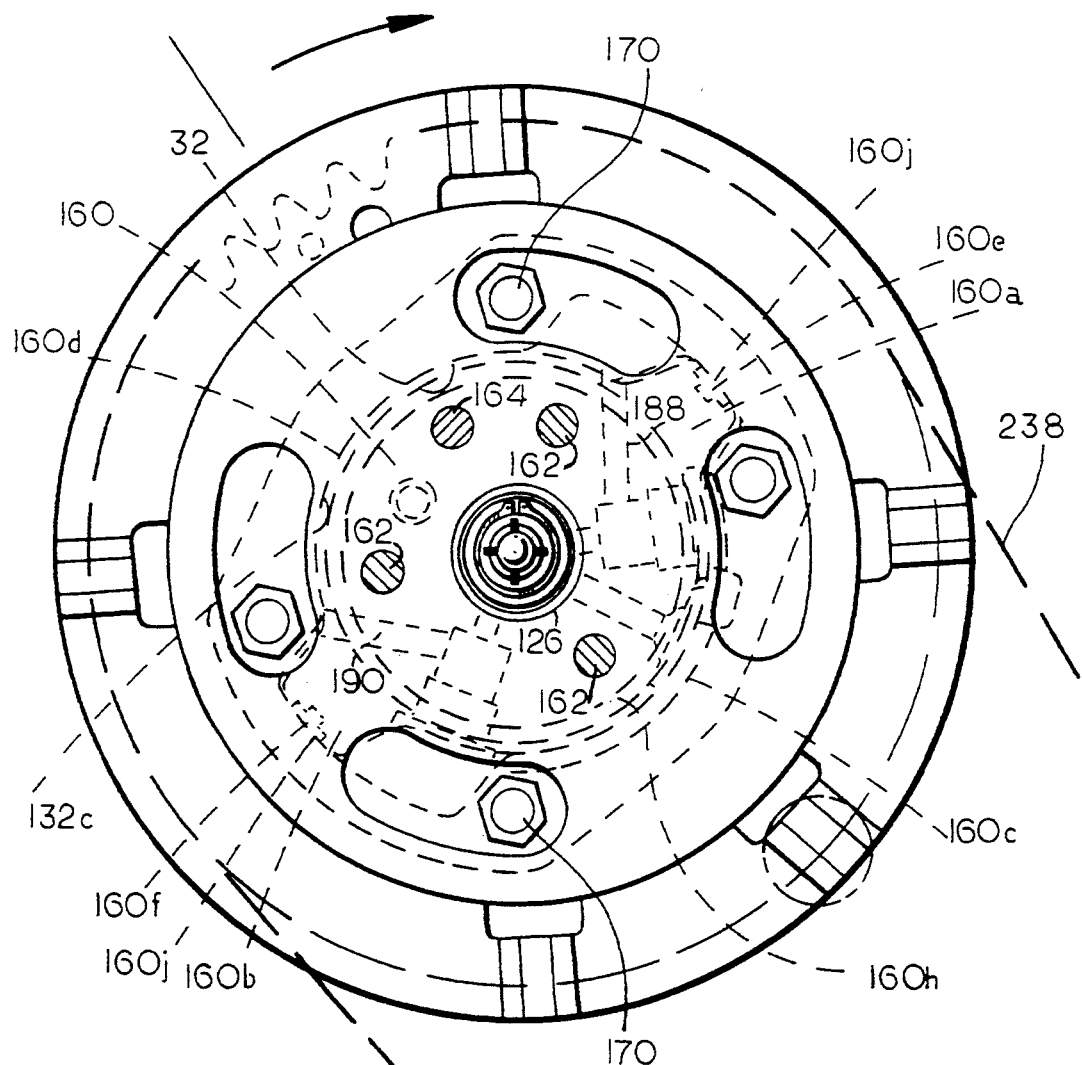
FIG. 14 is an end view of a spool valve of a VCT system in the advanced position.

An annular pumping vane 160 is fixedly positioned on the camshaft 126, the vane 160 having a diametrically opposed pair of hydraulic operators shown as radially outwardly projecting lobes 160a, 160b and being attached to an enlarged end portion 126a of the camshaft 126 by bolts 162 which pass through the vane 160 into the end portion 126a. In that regard, the camshaft 126 is also provided with a thrust shoulder 126b to permit the camshaft to be accurately positioned relative to an associated engine block. As shown in FIGS. 8 and 9, at least one annular passageway 124 is formed within either camshaft journal bearing 142 or 144 of the engine block for supplying hydraulic fluid to the interior of the camshaft 126.

The pumping vane 160 is precisely positioned relative to an end portion 126a of the camshaft 126 by a dowel pin 164 which extends therebetween. The lobes 160a, 160b are received in radially outwardly projecting recesses 132a, 132b, respectively, of a housing 130 which is bolted to the sprocket 132. The circumferential extent of each of the recesses 132a, 132b of the housing being somewhat greater than the circumferential extent of the vane lobe 160a, 160b which is received in such recess to permit limited oscillating movement of the sprocket 132 relative to the vane 160. The recesses 132a, 132b are closed around the lobes 160a, 160b, respectively, by a spaced apart transverse circular end plate 166 and the sprocket 132 which are fixed relative to the vane 160, and, thus, relative to the camshaft 126, by bolts 170 which extend from one to the other through the same lobe, 160a, 160b.

Attached to the vane 160 is a pulse wheel 161. The pulse wheel 161 is provided with a plurality of radial projections 168 non-evenly spaced around its exterior to permit a position sensor 172 such as a magnetic sensor of a type known in the art to determine the circumferential position of the pulse wheel and the vane 160 and the camshaft 126 based on the spacing detected between an adjacent pair of such projections.

The outer periphery 130a of the housing 130 is sealed with respect to the inner surface of the sprocket 132 and end plate 166 and between the lobes 160a, 160b, and the tips of the lobes 160a, 160b of the vane 160. The tips of the lobes 160a, 160b of the vane 160 are provided with seal receiving slots 160e, 160f, respectively for seals 160i. In addition, seals 160h are pressed into a slot 160j formed between the sprocket 132 and an inboard spacer 148 and the end plate 166 and an outboard spacer 150 thereby encircling the pumping vane 160. The seals 160h, 160i may be of any suitable design and material well known in the art. The seals 160h prevent hydraulic fluid from draining out of the VCT system when the engine is shut down and prevent hydraulic fluid from leaking out of the VCT system during engine cranking when hydraulic fluid pressure is zero and make-up hydraulic fluid is not available. Thus, each of the recesses 132a, 132b of the housing 130 is capable of retaining hydraulic fluid and sustaining hydraulic pressure, and within each recess 132a, 132b, the portion on each side of the lobe 160a, 160b, respectively, is capable of sustaining hydraulic pressure.

FIGS. 15-19 are a schematic depiction of the hydraulic control systems of the present invention and are applicable to either an opposed hydraulic cylinder VCT system corresponding to the embodiment(s) of FIGS. 1-9 of U.S. Pat. No. 5,172,659, as well as to a vane type VCT system corresponding to the embodiment(s) of FIGS. 10-18 of U.S. Pat. No. 5,172,659.

In any case, hydraulic fluid, illustratively in the form of engine lubricating oil, flows into the recesses 132a, 132b by way of a common inlet line 182. The inlet line 182 terminates at a juncture between opposed check valves 184 and 186 which are connected to the recesses 132a, 132b, respectively, by branch lines 188, 190, respectively. The check valves 184, 186 have annular seats 184a, 186a, respectively, to permit the flow of hydraulic fluid through the check valves 184, 186 into the recesses 132a, 132b, respectively. The flow of hydraulic fluid through the check valves 184, 186 is blocked by floating balls 184b, 186b, respectively, which are resiliently urged against the seats 184a, 186a, respectively, by springs 184c, 186c, respectively. The check valves 184, 186, thus, permit the initial filling of the recesses 132a, 132b and provide for a continuous supply of make-up hydraulic fluid to compensate for leakage therefrom. As shown in FIGS. 15-18, hydraulic fluid enters the line 182 by way of a secondary passage 220 extending from portion 198a of cylindrical member 198 to inlet line 182. A check valve 222 is positioned within the passage 220 to block the flow of hydraulic fluid from the inlet line 182 to the portion 198a of the cylindrical member 198.

The direction of flow of hydraulic fluid is controlled by way of a spool valve 192, which is incorporated within the camshaft 126 in the embodiment of FIGS. 7-19. The spool valve 192 is made up of a cylindrical member 198 and a spool 200 which is slidable to and fro within the cylindrical member. The spool 200 may have cylindrical lands 200a and 200b on opposed ends thereof FIG. 19 or the spool may have spaced cylindrical lands 200a and 200b and a rim member 200i, FIGS. 15-18. The lands 200a and 200b, which fit snugly within the member 198, are positioned so that the land 200b will block the exit of hydraulic fluid from return line 196 (FIG. 16), or the land 200a will block the exit of hydraulic fluid from return line 194 (FIG. 15), or the lands 200a and 200b will block the exit of hydraulic fluid from both return lines 194 and 196 as shown in FIGS. 17 and 19, where the camshaft 126 is being maintained in a selected intermediate position relative to the crankshaft of the associated engine.

Figure 15:
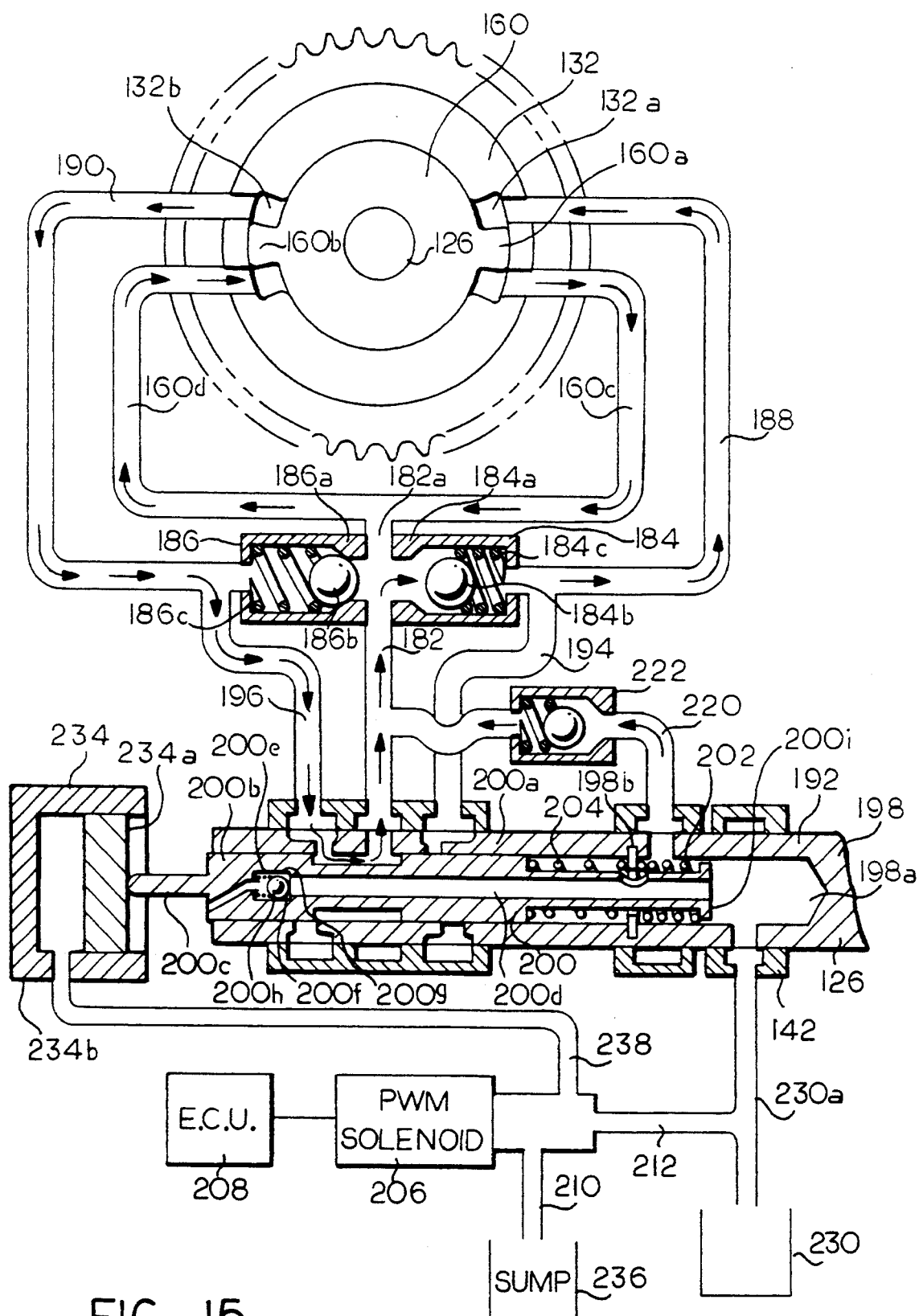
FIG. 15 is a simplified schematic view of a VCT system having a spool valve in the advanced position.
Figure 16:
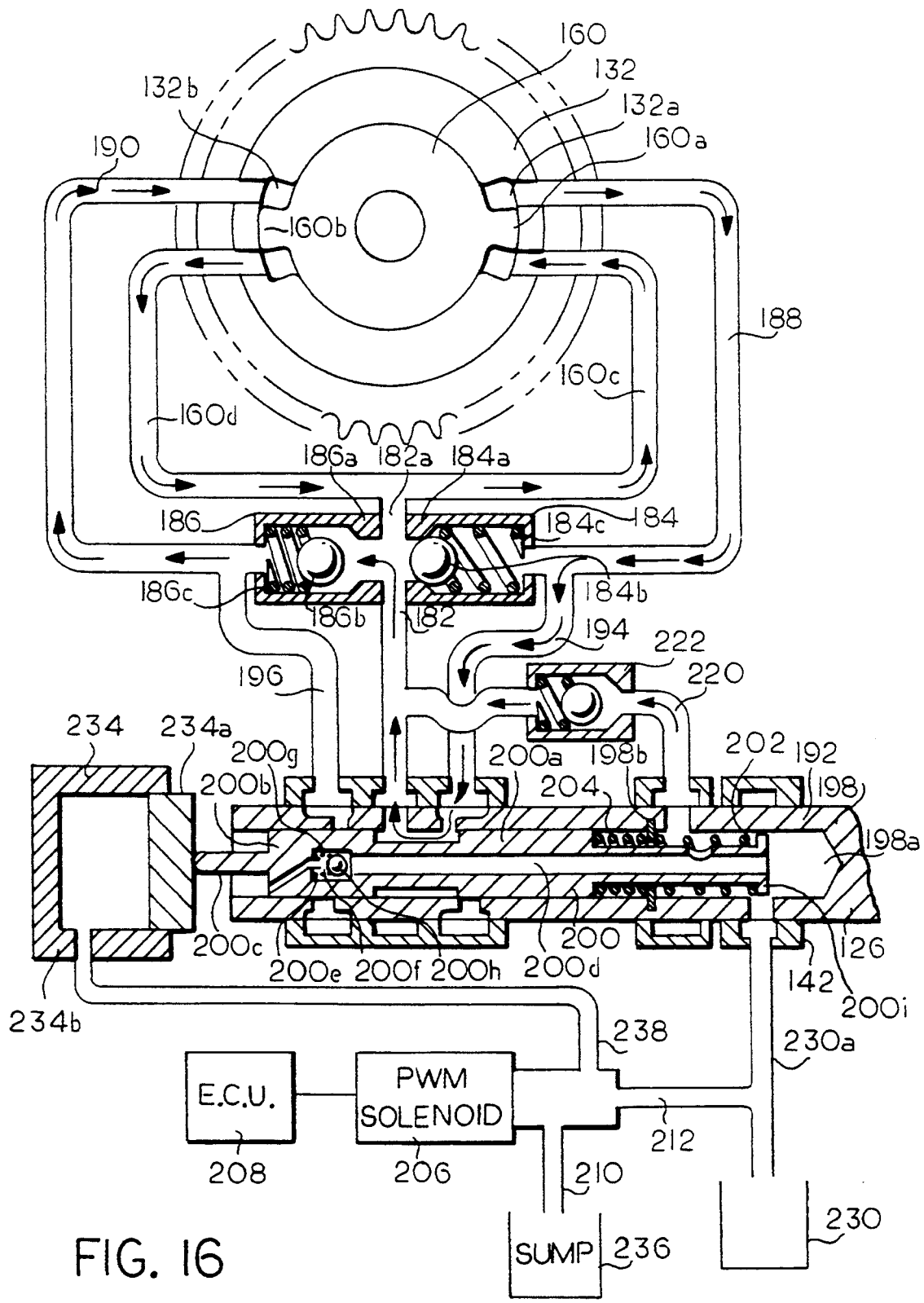
FIG. 16 is a simplified schematic view of a VCT system having a spool valve in the retarded position.
Figure 17:
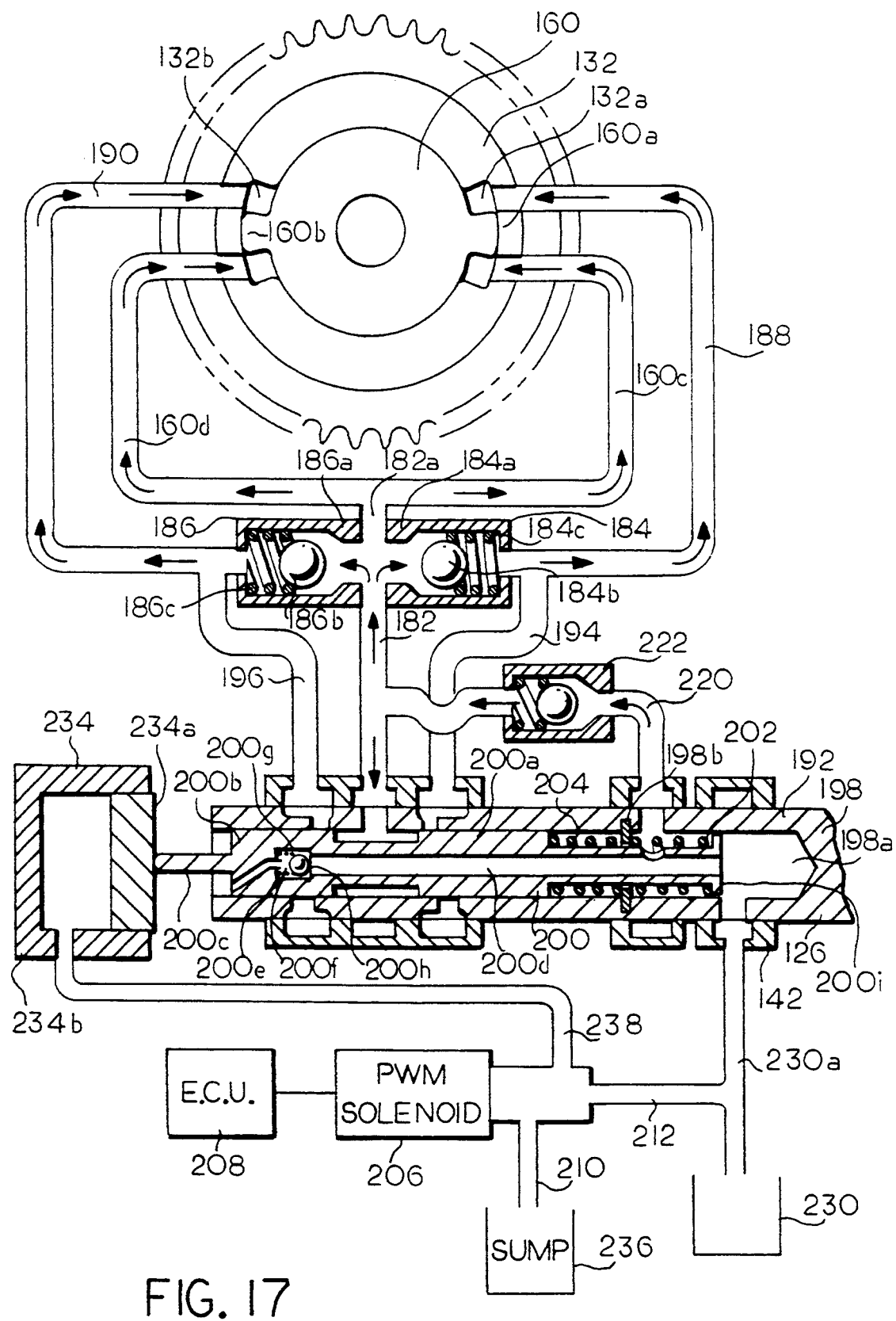
FIG. 17 is a simplified schematic view of a VCT system having a spool valve in the mid position.

As shown in FIGS. 15-17, formed the longitudinal length of the spool 200 is an interior cylindrical opening 200d to provide communication between portion 198a and external the VCT system. As explained later in more detail, a check valve 200f having an annular seat 200g, and a ball 200h is biased by spring 200e from the annular seat and permits the flow of air from portion 198a through the cylindrical opening 200d and check valve external the VCT system.

In operation, rotation of the camshaft 126 separates the higher density hydraulic fluid from air within the camshaft by causing the denser hydraulic fluid to flow to the outer periphery of the interior of the camshaft thereby forcing the air through opening 200d and check valve 200f to purge the air from the VCT system.

The hydraulic fluid passage 220 positioned at the circumference of the camshaft assures only hydraulic fluid enters the VCT system thereby preventing oscillation of the hydraulic operators. As the camshaft 126 continues to rotate and after the air is removed from the VCT system the remaining hydraulic fluid contacts the ball 200h such that the pressure of hydraulic fluid against the spring biased ball causes the ball to contact the seat 200g and stop the flow of hydraulic fluid from the camshaft 126. It will be appreciated, if desired, the ball 200h may also be permanently biased from the seat 200g such that the ball does not completely seal with the seat thereby allowing air that inadvertently enters the VCT system to be continually purged from the system.

Figure 18:
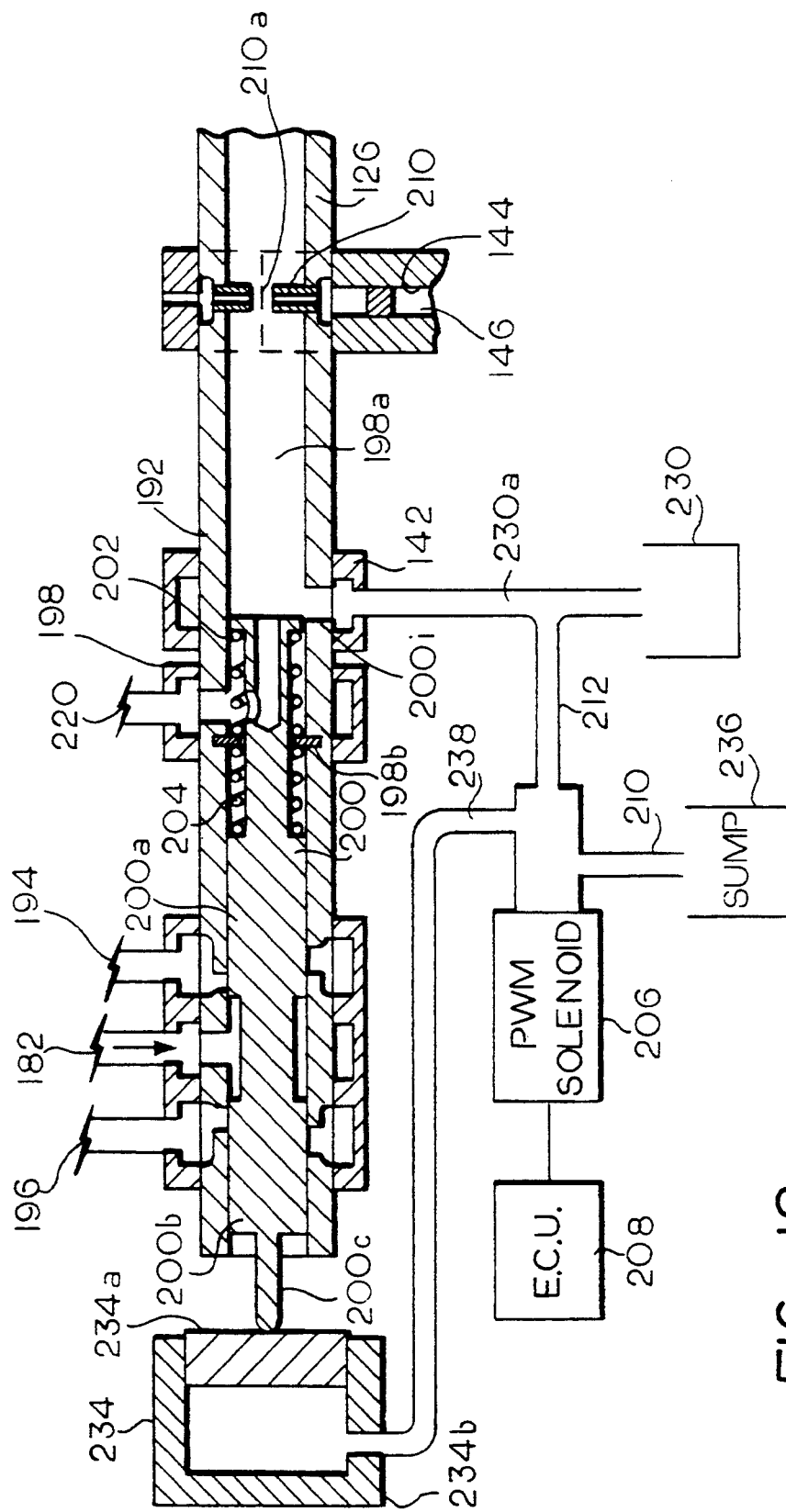
FIG. 18 is a simplified schematic view of a portion of a VCT system in accordance with FIG. 9.
Figure 19:
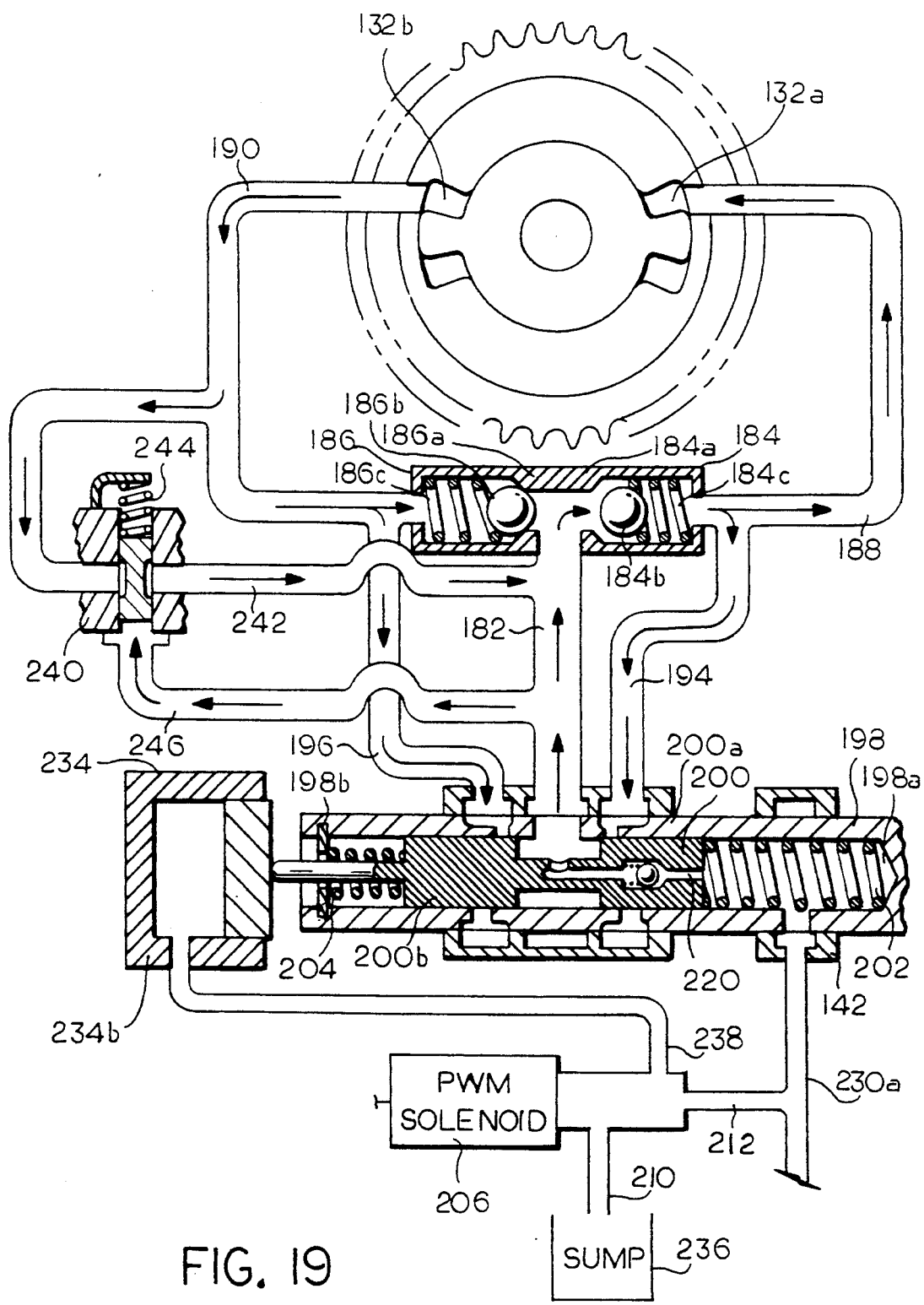
FIG. 19 is a simplified schematic view of a VCT system in accordance with another aspect of the present invention.

In yet another embodiment of the present invention as shown in FIG. 18, air may also be purged from the camshaft 126 by a tube 210 inserted radially under a camshaft journal bearing 142 or 144 having a blocked hydraulic fluid feed tube 146. The longitudinal length of the tube 210 is positioned across the largest diameter portion of the camshaft 126 and includes an orifice 210a near the diametrical center of the camshaft 126 such that as the camshaft rotates the hydraulic fluid moves to the largest diameter of the camshaft bore, portion 198a and through passage 220, thereby forcing the air to the center of the camshaft and out the tube through the camshaft journal bearing external the VCT system in a manner similar to that previously described. It will be appreciated, that a tube 210 positioned on a camshaft journal bearing 142 or 144 prevents the camshaft from completely draining when the engine is turned off thereby minimizing the amount of air required to be purged during engine start-up.

The position of the spool 200 within the member 198 is influenced by a pair of counter balance springs 202, 204 to provide opposing forces to effect a restoring force to place the spool 200 in a predetermined equilibrium position when insufficient force is exerted on the spool to overcome the force of the springs 202, 204 and cause the spool to move. The springs 202, 204 are positioned between stop member 198b and land 200a and member 198b and rim member 200i (FIGS. 15–18), or in an alternative embodiment, between stop member 198b at the forward end of cylindrical member 198 and land 200b and land 200a and the inner end wall of portion 198a. In operation, the spring 202 resiliently urges the spool 200 to the right and the spring 204 resiliently urges the spool 200 to the left in the orientation illustrated in FIGS. 15–18, and, in the orientation illustrated in FIG. 19 spring 202 resiliently urges the spool to the left and the spring 204 resiliently urges the spool to the right such that absent the application of outside forces to the spool an equilibrium position is maintained. In a preferred embodiment, the spool 200 is balanced at an equilibrium position that causes the VCT system to move either to the fully advanced or fully retarded position such that the return lines 194, 196 from the recesses 132a, 132b are open when the control system is at zero hydraulic fluid pressure.

During engine cranking sufficient torque is generated by the rotation of the camshaft 126 to cause the VCT system to move relative to the camshaft. As the VCT system moves relative to the camshaft 126 the spool is spring loaded by the force of springs 202 and 204 to a biased position, i.e. a position other than the null position, such that the VCT system will eventually move to either the advanced position or the retarded position as desired during zero hydraulic fluid pressure. The preferred spring loaded position of the spool is the minimum distance from null required to initiate movement of the VCT. It will be appreciated that it is desirable to spring load the spool as close to null as possible so that when the VCT system wants the spool to return to the null position the spool will closely approximate the null position by setting the hydraulic fluid control pressure to approximately 50% of the hydraulic fluid pressure within the source. The VCT system then adjusts the spool position to the actual null position based upon the response the control system senses from the VCT. The closer the spool biased position is to null the less fine tuning the control system has to perform. Once sufficient oil pressure is obtained in the engine the spool is positioned in the null position, FIGS. 17–19. In view of the foregoing the equilibrium position of the spool 200 may be varied as desired and the position of the springs 202, 204 acting on the spool may also be varied as desired in conformity with the teachings of the present invention.

FIG. 19 illustrates yet another embodiment of the present invention. The VCT system shown in FIG. 19 includes a secondary hydraulic fluid passage 220 formed internal of the spool 200 and a bypass circuit in communication with inlet line 182 and branch line 190. Hydraulic fluid for the recesses 132a, 132b of the sprocket 132 is provided by way of the internal fluid passage 220 within the spool 200, from the portion 198a of the cylindrical member 198, from which it can flow into the inlet line 182. A check valve 222 is positioned within the passage 220 to block the flow of oil from the annular space to the portion 198a of the cylindrical member 198.

The bypass circuit of the VCT system of FIG. 19 includes a bypass valve 240 for controlling the flow of hydraulic fluid through a first bypass line 242 between inlet line 182 and branch line 190. The bypass valve 240 is placed across the first bypass line 242 and biased by a spring 244 and oppositely acting hydraulic pressure from a second bypass line 246. In operation, the bypass valve 240 is biased by the spring 244 to the open position to allow flow of hydraulic fluid from the recess 132b when the engine is operating at zero hydraulic fluid pressure to allow the VCT system to go to advanced position or retarded position as desired and for the VCT system to operate as previously described when hydraulic fluid pressure is developed and the bypass circuit is closed. It will be appreciated that when the bypass circuit is open the VCT system may still operate, i.e., allow the hydraulic fluid to flow at maximum rate such that the VCT system will quickly obtain the advanced or retarded position. In contrast, the biased spool previously described does not operate at maximum rate because minimum bias required to move the VCT system is desired so that the control system is not adversely affected when the control system wants to return the spool to the null position.

The position of the spool 200 within the cylindrical member 198 is influenced by a supply of pressurized hydraulic fluid within a portion 198a of the member 198, on the outside of the land 200a, which urges the spool 200 to the left. The portion 198a of the member 198 receives its pressurized hydraulic fluid (engine oil) directly from the main oil gallery ("MOG") 230 of the engine by way of a conduit 230a, and this hydraulic fluid is also used to lubricate the bearings 142, 144 in which the camshaft 126 of the engine rotates.

During operation, the control of the position of the spool 200 within the member 198 is in response to hydraulic pressure within a control pressure cylinder 234 whose piston 234a bears against a bearing 248 (FIGS. 8-11) within an extension 200c of the spool 200. The surface area of the piston 234a is greater than the surface area of the end of the spool 200 which is exposed to hydraulic pressure within the portion 198, and is preferably twice as great. Thus, the hydraulic pressures which act in opposite directions on the spool 200 will be in balance when the pressure within the cylinder 234 is one-half that of the pressure within the portion 198a, assuming that the surface area of the piston 234a is twice that of the end of the land 200a of the spool. This facilitates the control of the position of the spool 200 in that, if the springs 202 and 204 are balanced, the spool 200 will remain in its null or centered position, as illustrated in FIGS. 17-19, with less than full engine oil pressure in the cylinder 234, thus allowing the spool 200 to be moved in either direction by increasing or decreasing the pressure in the cylinder 234, as the case may be. Further, the operation of the springs 202, 204 will ensure the return of the spool 200 to its null or centered position when the hydraulic loads on the ends of the lands 200a, 200b are removed.

While the use of springs such as the springs 202, 204 is preferred in the centering of the spool 200 within the member 198, it is also contemplated that electromagnetic or electrooptical centering means can be employed, if desired.

The pressure within the cylinder 234 is controlled by a solenoid 206, preferably of the pulse width modulated type (PWM), in response to a control signal from an electronic engine control unit (ECU) 208, shown schematically, which may be of conventional construction. With the spool 200 in its null position when the pressure in the cylinder 234 is equal to one-half the pressure in the portion 198a, as heretofore described, the on-off pulses of the solenoid 206 will be of equal duration; by increasing or decreasing the on duration relative to the off duration, the pressure in the cylinder 234 will be increased or decreased relative to such one-half level, thereby moving the spool 200 to the right (FIG. 16) or to the left (FIG. 15), respectively. The solenoid 206 receives hydraulic fluid from the engine oil gallery 230 through an inlet line 212 and selectively delivers hydraulic fluid from such source to the cylinder 234 through a supply line 238. Excess hydraulic fluid from the solenoid 206 is drained to a sump 236 by way of a line 210. The cylinder 234 may be mounted at an exposed end of the camshaft 126 so that the piston 234a bears against the bearing 248 within exposed free end of extension 200c of the spool 200. In this case, the solenoid 206 is preferably mounted in a housing 234b which also houses the cylinder 234.

By using imbalances between oppositely acting hydraulic loads from a common hydraulic source on the opposed ends of the spool 200 to move it in one direction or another, as opposed to using imbalances between an hydraulic load on one end and a mechanical load on an opposed end, the control system of FIGS. 15-19 is capable of operating independently of variations in the viscosity or pressure of the hydraulic system. Thus, it is not necessary to vary the duty cycle of the solenoid 208 to maintain the spool 200 in any given position, for example, in its centered or null position, as the viscosity or pressure of the hydraulic fluid changes during the operation of the system. In that regard, it is to be understood that the centered or null position of the spool 200 is the position where no change in camshaft to crankshaft phase angle is occurring, and it is important to be able to rapidly and reliably position the spool 200 in its null position for proper operation of a VCT system and to return the spool to the fully advanced or fully retarded position when the engine is shut down by the action of the springs 202, 204 so that during engine start-up the VCT system may operate quietly with low hydraulic fluid pressure.

Hydraulic fluid for the recesses 132a, 132b of the sprocket 132 is provided by way of a secondary passage 220 extending from portion 198a to inlet line 182. A check valve 222 is positioned within the passage 220 to block the flow of hydraulic fluid from the inlet line 182 to the portion 198a of the cylindrical member 198.

The vane 160 is alternatingly urged in clockwise and counterclockwise directions by the torque pulsations in the camshaft 126 and these torque pulsations tend to oscillate the vane 160, and, thus, the camshaft 126, relative to the sprocket 132. However, in the FIG. 17 position of the spool 200 within the cylindrical member 198, such oscillation is prevented by the hydraulic fluid within the recesses 132a, 132b of the sprocket 132 on opposite sides of the lobes 160a, 160b, respectively, of the vane 160, because no hydraulic fluid can leave either of the recesses 132a, 132b, since both return lines 194, 196 are blocked by the position of the spool 200. If, for example, it is desired to permit the camshaft 126 and vane 160 to move in a counterclockwise direction with respect to the sprocket 132, it is only necessary to increase the pressure within the cylinder 234 to a level greater than one-half that in the portion 198a of the cylindrical member. This will urge the spool 200 to the right and thereby unblock the return line 194 (FIG. 16) allowing hydraulic fluid to pass through such return line into the inlet line 182 by way of an annular space which is defined by the inside of the member 198 and the outside of a reduced diameter portion of the spool 200, the reduced diameter portion being positioned between the lands 200a and 200b. In this condition of the apparatus, counterclockwise torque pulsations in the camshaft 126 will pump fluid out of the portion of the recess 132a and allow the lobe 160a of vane 160 to move into the portion of the recess which has been emptied of hydraulic fluid. However, reverse movement of the vane will not occur as the torque pulsations in the camshaft become oppositely directed unless and until the spool 200 moves to the left, because of the blockage of fluid flow through the return line 196 by the land 200b of the spool 200. While illustrated as a separate closed passage in FIGS. 15-17 and 19, the periphery of the vane 160 has an open hydraulic fluid passage slot 160c which permits the transfer of hydraulic fluid between the portion of the recess 132a on the right side of the lobe 160a and the portion of the recess 132b on the right side of the lobe 160b, which are the non-active sides of the lobes 160a, 160b; thus, counterclockwise movement of the vane 160 relative to the sprocket 132 will occur when flow is permitted through return line 194 and clockwise movement will occur when flow is permitted through return line 196.

Further, the inlet line 182 is provided with an extension 182a to the non-active side of one of the lobes 160a, 160b, shown as the lobe 160b, to permit a continuous supply of make-up hydraulic fluid to the non-active sides of the lobes 160a, 160b for better rotational balance, improved damping of vane motion, and improved lubrication of the bearing surfaces of the vane 160. It is to be noted that the supply of make-up hydraulic fluid in this manner avoids the need to route the make-up hydraulic fluid through the solenoid 206. Thus, the flow of make-up hydraulic fluid does not affect, and is not affected by, the operation of the solenoid 206. Specifically make-up hydraulic fluid will continue to be provided to the lobes 160a, 160b in the event of a failure of the solenoid 206, and it reduces the hydraulic fluid flow rates that need to be handled by the solenoid 206.

Although the present invention has been described in detail in connection with a VCT system in which the system hydraulics include a pumping vane having lobes within an enclosed housing it will be readily apparent to one skilled in the art that the pumping vane may be replaced with a pair of oppositely acting hydraulic cylinders with appropriate hydraulic flow elements to selectively transfer hydraulic fluid from one of the cylinders to the other as desired. Accordingly, the detailed description of a VCT system in accordance with the invention having a pumping vane and lobes within an enclosed housing is not to be construed as a limitation on the scope of the invention.

Having described presently preferred embodiments of the invention, it is to be understood that it may be otherwise embodied within the scope of the appended claims.

What is claimed is:

1. A variable camshaft timing (VCT) system for an internal combustion engine having a rotatable crankshaft and a rotatable camshaft, the camshaft being position variable relative to the crankshaft, the VCT system comprising;

at least one pair of oppositely acting hydraulic operators secured to the camshaft for rotation therewith and having a housing mounted on the camshaft for rotation and oscillation with the camshaft, said housing having a recess for receiving said at least one pair of oppositely acting hydraulic operators and permitting oscillation of said at least one pair oppositely acting hydraulic operators within said recess as said housing oscillates with respect to said camshaft;

means for controlling a position of said at least one pair of oppositely acting hydraulic operators with respect to said housing by selective movement of hydraulic fluid; and means for removing air from said VCT system in response to the camshaft as the camshaft rotates.

2. The VCT system of claim 1 wherein said means for removing air from said VCT system further comprises means for separating air from said hydraulic fluid.

3. The VCT system of claim 2 wherein said air is separated from hydraulic fluid by a centrifugal force separating means.

4. The VCT system of claim 3 wherein said hydraulic operators include a first lobe connected to said crankshaft and to said camshaft, operation of said first lobe being effective to vary the position of the camshaft relative to the crankshaft in a given circumferential direction and a second lobe connected to the crankshaft and the camshaft, operation of the second lobe being effective to vary the position of the camshaft relative to the crankshaft in an opposed circumferential direction.

5. The VCT system of claim 1 wherein said control means comprises:

a source of hydraulic fluid under pressure in communication with the camshaft;

a secondary passage for supplying hydraulic fluid from the camshaft to said housing recess;

a spool valve for selectively controlling movement of hydraulic fluid for actuating the oscillation of said hydraulic operators within said housing recess as said housing oscillates with respect to said camshaft; said spool valve including a cylindrical member in communication with said camshaft and a spool reciprocating within said cylindrical member and having first and second spaced apart lands, wherein said means for removing air includes an opening formed in the longitudinal length of said spool to provide communication between said camshaft and external the VCT system.

6. The VCT system of claim 5 wherein said secondary passage is in fluid communication with the camshaft such that during rotation of the camshaft hydraulic fluid within the camshaft is centrifugally driven to the camshaft outer circumference through said secondary passage to said housing recess.

7. The VCT system of claim 6 wherein said opening has interposed therein a check valve to regulate flow of air from said camshaft through said opening external the VCT system.

8. The VCT system of claim 7 wherein said check valve includes a spring biased ball for regulating the flow of air from said VCT system such that upon completion of the expulsion of air from the VCT system the hydraulic fluid contacts said biased ball causing said ball to close said valve and stop the flow of hydraulic fluid from the camshaft.

9. The VCT system of claim 1 wherein said means for removing air comprises a tube positioned across a diameter of said camshaft and in communication with external of the VCT system, said tube having an orifice near a diametrical center of said camshaft such that as said camshaft rotates the hydraulic fluid separates from said air thereby forcing said air through said orifice of said tube.

10. The VCT system of claim 9 wherein said tube is positioned on a camshaft journal bearing supporting said camshaft such that said tube prevents said camshaft from completely draining when the engine is turned off thereby minimizing the amount of air to be purged during engine start-up.

11. The VCT system of claim 10 wherein said control means comprises:

a source of hydraulic fluid under pressure in communication with the camshaft;

a spool valve for selectively controlling movement of hydraulic fluid for actuating the oscillation of said hydraulic operators within said housing recess as said housing oscillates with respect to said camshaft; said spool valve including a cylindrical member and spool reciprocal within said cylindrical member and having first and second spaced apart lands; and a secondary passage in fluid communication with an outer circumference of the camshaft such that during rotation of the camshaft hydraulic fluid within the camshaft is centrifugally driven to the outer circumference of an interior of the camshaft through said secondary passage to said housing recess.

12. The VCT system of claim 11 wherein said hydraulic operators include a first lobe connected to said crankshaft and to said camshaft, the operation of said first lobe being effective to vary the position of the camshaft relative to the crankshaft in a given circumferential direction and a second lobe connected to the crankshaft and the camshaft, the operation of the second lobe being effective to vary the position of the camshaft relative to the crankshaft in an opposed circumferential direction.

13. The VCT system of claim 8 wherein said secondary passage is in fluid communication with the outer circumference of the camshaft such that during rotation of the camshaft, hydraulic fluid within the camshaft is centrifugally driven to the outer circumference of the camshaft to said secondary passage and any air within the camshaft is driven to a center of the camshaft for purging through said cylindrical opening external the VCT system.

14. The VCT system of claim 13 wherein said hydraulic operators include a first lobe connected to said crankshaft and to said camshaft, the operation of said first lobe being effective to vary the position of the camshaft relative to the crankshaft in a given circumferential direction and a second lobe connected to the crankshaft and the camshaft, the operation of the second lobe being effective to vary the position of the camshaft relative to the crankshaft in an opposed circumferential direction.

15. The VCT system of claim 8 wherein said ball does not completely seal with a seat of said check valve.

16. A variable camshaft timing (VCT) system for an internal combustion engine having a rotatable crankshaft and a rotatable camshaft, the camshaft being position variable relative to the crankshaft, the VCT system comprising:

at least one pair of oppositely acting hydraulic operators secured to said camshaft for rotation therewith and having a housing mounted on said camshaft for rotation and oscillation with said camshaft, said housing having a recess for receiving said at least one pair of oppositely acting hydraulic operators and permitting oscillation of said at least one pair of oppositely acting hydraulic operators within said recess as said housing oscillate with respect to said camshaft;

a source of hydraulic fluid under pressure;

a first and second conduit means for delivering hydraulic fluid from said source to each of said at least one pair of oppositely acting hydraulic operators to operate said hydraulic operators, respectively; second and third conduit means for exhausting hydraulic fluid from each of said at least one pair of oppositely acting hydraulic operators for exhausting hydraulic fluid from each of said hydraulic operators respectively;

a spool valve for selectively controlling movement of hydraulic fluid for actuating the oscillation of said hydraulic operators within maid housing recess as said housing oscillates with respect to said camshaft; said spool valve having a cylindrical member and spool including a secondary passage for supplying hydraulic fluid from the camshaft to said housing recess; maid spool reciprocating within said cylindrical member and having first and second spaced apart lands; and means for positioning said spool at a fully advanced or fully retarded position when the VCT system is at zero hydraulic fluid pressure, said positioning means includes a bypass circuit having a bypass valve and a first bypass line, said first bypass line in communication with said first conduit means and at least one of said hydraulic operators, said bypass valve interposed across said first bypass line and biased by a spring and oppositely acting hydraulic pressure from a second bypass line in communication with said first conduit means such that, when the engine is operating at zero hydraulic fluid pressure said bypass valve is biased by said spring to an open position to allow flow of hydraulic fluid from said at least one of said hydraulic operators and, after the engine develops sufficient hydraulic fluid pressure said bypass valve is biased to a closed position by said spring and engine hydraulic fluid pressure in the second bypass line.

17. The VCT system of claim 16 wherein said positioning means includes a pair of counter balance springs acting on said spool to provide opposing forces to said spool to position said spool at a fully advanced or fully retarded position when the VCT system is at zero hydraulic fluid pressure.

18. The VCT system of claim 16 wherein said hydraulic operators include a first lobe connected to said crankshaft and to said camshaft, the operation of said first lobe being effective to vary the position of the camshaft relative to the crankshaft in a given circumferential direction and a second lobe connected to the crankshaft and the camshaft, the operation of the second lobe being effective to vary the position of the camshaft relative to the crankshaft in an opposed circumferential direction.

19. A variable camshaft timing (VCT) system for an internal combustion engine having a rotatable crankshaft and a rotatable camshaft, the camshaft being position variable relative to the crankshaft, the VCT system comprising:

at least one pair of oppositely acting hydraulic operators secured to said camshaft for rotation therewith and having a housing mounted on said camshaft for rotation and oscillation with said camshaft, said housing having a recess for receiving said at least one pair of oppositely acting hydraulic operators and permitting oscillation of said at least one pair of oppositely acting hydraulic operators within said recess as said housing oscillates with respect to said camshaft, said housing recess enclosed around said hydraulic operators by an opposing circular end plate and outboard spacer and a sprocket and inboard spacer, said end plate and said sprocket fixed relative to said camshaft;

a source of hydraulic fluid under pressure in communication with the camshaft;

a first and second conduit means for delivering hydraulic fluid from said source to each of said at least one pair of oppositely acting hydraulic operators to operate said hydraulic operators, respectively; second and third conduit means for exhausting hydraulic fluid from each of said at least one pair of oppositely acting hydraulic operators;

a spool valve for selectively controlling movement of hydraulic fluid for actuating the oscillation of said hydraulic operators within said housing recess as said housing oscillates with respect to said camshaft; said spool valve having a cylindrical member and a spool slidable within said cylindrical member, said spool including a secondary passage in communication with an outer circumference of the camshaft such that during rotation of the camshaft hydraulic fluid within the camshaft is centrifugally driven to a radially outer portion of an interior of the camshaft through said secondary passage to said housing recess for supplying hydraulic fluid from the camshaft to said housing recess, said spool reciprocal within said cylindrical member and having first and second spaced apart lands;

means for positioning said spool at an advanced or retarded position when the VCT system is at zero hydraulic fluid pressure;

means for removing air from said VCT system in response to the rotation of the camshaft; and means for sealing said end plate with respect to said outboard spacer and said sprocket with respect to said inboard spacer to prevent hydraulic fluid from draining out of the VCT system when the engine is shut down and prevent hydraulic fluid from leaking out of the VCT system during engine cranking when hydraulic fluid pressure is zero and make-up hydraulic fluid is not available.

20. The VCT system of claim 19 wherein said means for removing air includes an opening formed in the longitudinal length of said spool to provide communication between said camshaft and external the VCT system.

21. The VCT system of claim 19 wherein said means for removing air comprises a tube positioned across a diameter of said camshaft and in communication with external of the VCT system, said tube having an orifice near a diametrical center of said camshaft such that as said camshaft rotates the hydraulic fluid separates from said air thereby forcing said air through said orifice of said tube.

22. The VCT system of claim 19 wherein said positioning means includes a pair of counter balance springs acting on said spool to provide opposing forces to said spool to position said spool at a fully advanced or fully retarded position when the VCT system is at zero hydraulic fluid pressure.

23. The VCT system of claim 19 wherein said positioning means includes a bypass circuit having a bypass valve and a first bypass line, said first bypass line in communication with said first conduit means and at least one of said hydraulic operators, said bypass valve interposed across said first bypass line and biased by a spring and oppositely acting hydraulic pressure from a second bypass line in communication with said first conduit means such that, when the engine is operating at zero hydraulic fluid pressure said bypass valve is biased by said spring to an open position to allow flow of hydraulic fluid from said at least one of said hydraulic operators and, after the engine develops sufficient oil pressure said bypass valve is biased to a closed position by said spring and engine hydraulic fluid pressure in the second bypass line.

* * * * *